(12) United States Patent
Min et al.

(10) Patent No.: US 9,967,572 B2
(45) Date of Patent: May 8, 2018

(54) DETERMINING INTRA PREDICTION MODE OF IMAGE CODING UNIT AND IMAGE DECODING UNIT

(71) Applicant: SAMSUNG ELECTRONICS CO., LTD., Suwon-si (KR)

(72) Inventors: Jung-hye Min, Suwon-si (KR); Elena Alshina, Suwon-si (KR); Woo-jin Han, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days. days.

(21) Appl. No.: 15/701,022

(22) Filed: Sep. 11, 2017

(65) Prior Publication Data

US 2017/0374370 A1 Dec. 28, 2017

Related U.S. Application Data

(63) Continuation of application No. 15/486,458, filed on Apr. 13, 2017, now Pat. No. 9,794,577, which is a (Continued)

(30) Foreign Application Priority Data

Apr. 5, 2010 (KR) .................. 10-2010-0031145

(51) Int. Cl.
*H04N 11/02* (2006.01)
*H04N 11/04* (2006.01)
(Continued)

(52) U.S. Cl.
CPC ......... *H04N 19/159* (2014.11); *H04N 19/105* (2014.11); *H04N 19/107* (2014.11); *H04N 19/11* (2014.11); *H04N 19/122* (2014.11); *H04N 19/13* (2014.11); *H04N 19/176* (2014.11); *H04N 19/186* (2014.11); *H04N 19/30* (2014.11); *H04N 19/44* (2014.11); *H04N 19/50* (2014.11); *H04N 19/593* (2014.11);
(Continued)

(58) Field of Classification Search
None
See application file for complete search history.

(56) References Cited

U.S. PATENT DOCUMENTS 9,118,913 B2    8/2015    Alshina et al.
9,351,006 B2    5/2016    Kim et al.
(Continued)

FOREIGN PATENT DOCUMENTS

CA    2884486 A1    10/2011
CA    2884540 A1    10/2011
(Continued)

OTHER PUBLICATIONS

International Search Report (PCT/ISA/210) issued on Dec. 7, 2011 in the International Patent Application No. PCT/KR2011/002375.
(Continued)

*Primary Examiner* — Talha M Nawaz
(74) *Attorney, Agent, or Firm* — Sughrue Mion, PLLC

(57) ABSTRACT

A method for decoding an image including performing intra prediction on a chrominance block according to whether the intra prediction mode of the chrominance block is equal to an intra prediction mode of a luminance block.

1 Claim, 27 Drawing Sheets

Related U.S. Application Data continuation of application No. 14/597,724, filed on Jan. 15, 2015, now Pat. No. 9,667,974, which is a continuation of application No. 13/969,871, filed on Aug. 19, 2013, now Pat. No. 8,964,840, which is a continuation of application No. 13/080,021, filed on Apr. 5, 2011, now Pat. No. 8,619,858.

(51) Int. Cl.

| | | |
|---|---|---|
| H04N 7/12 | (2006.01) | |
| H04N 19/159 | (2014.01) | |
| H04N 19/30 | (2014.01) | |
| H04N 19/44 | (2014.01) | |
| H04N 19/186 | (2014.01) | |
| H04N 19/107 | (2014.01) | |
| H04N 19/11 | (2014.01) | |
| H04N 19/593 | (2014.01) | |
| H04N 19/96 | (2014.01) | |
| H04N 19/122 | (2014.01) | |
| H04N 19/176 | (2014.01) | |
| H04N 19/50 | (2014.01) | |
| H04N 19/105 | (2014.01) | |
| H04N 19/13 | (2014.01) | |
| H04N 19/182 | (2014.01) | |
| H04N 19/184 | (2014.01) | |

(52) U.S. Cl.
CPC .......... *H04N 19/96* (2014.11); *H04N 19/182* (2014.11); *H04N 19/184* (2014.11)

(56) References Cited

U.S. PATENT DOCUMENTS

| | | | |
|---|---|---|---|
| 9,497,465 B2 | 11/2016 | Kim et al. | |
| 2005/0141618 A1 | 6/2005 | Park et al. | |
| 2006/0146191 A1* | 7/2006 | Kim ................. | H04N 19/176 348/557 |
| 2006/0188023 A1* | 8/2006 | Ju .................... | H04N 19/124 375/240.22 |
| 2006/0215763 A1* | 9/2006 | Morimoto ......... | H04N 19/159 375/240.18 |
| 2007/0133891 A1 | 6/2007 | Jeong | |
| 2008/0170615 A1 | 7/2008 | Sekiguchi et al. | |
| 2008/0181304 A1 | 7/2008 | Sekiguchi et al. | |
| 2008/0253448 A1* | 10/2008 | Lin .................... | H04N 19/15 375/240.03 |
| 2008/0285652 A1* | 11/2008 | Oxman ............... | H04N 19/61 375/240.16 |
| 2009/0046781 A1* | 2/2009 | Moriya .............. | H04N 19/105 375/240.12 |
| 2009/0190659 A1* | 7/2009 | Lee ..................... | H04N 19/176 375/240.12 |
| 2010/0002943 A1 | 1/2010 | Moon et al. | |
| 2010/0232505 A1 | 9/2010 | Thoreau et al. | |
| 2011/0176614 A1 | 7/2011 | Sato et al. | |
| 2011/0211757 A1 | 9/2011 | Kim et al. | |
| 2011/0222723 A1* | 9/2011 | He .................... | G06T 1/0028 382/100 |
| 2012/0057801 A1* | 3/2012 | Aldrich ............. | H04N 19/44 382/233 |
| 2013/0010866 A1 | 1/2013 | Ju | |
| 2014/0105291 A1 | 4/2014 | Nakamura et al. | |
| 2015/0139328 A1 | 5/2015 | Lee et al. | |
| 2015/0249831 A1 | 9/2015 | Kim et al. | |
| 2015/0271501 A1 | 9/2015 | Kim et al. | |

FOREIGN PATENT DOCUMENTS

| | | |
|---|---|---|
| CN | 101160970 A | 4/2008 |
| CN | 101222644 A | 7/2008 |
| CN | 101385356 A | 3/2009 |
| EP | 1705920 A2 | 9/2006 |
| EP | 1753242 A2 | 2/2007 |
| EP | 1950971 A2 | 7/2008 |
| EP | 2545713 B1 | 5/2016 |
| JP | 2008172599 A | 7/2008 |
| JP | 2009527169 A | 7/2009 |
| JP | 2009529845 A | 8/2009 |
| JP | 2010-35137 A | 2/2010 |
| JP | 2011-526770 A | 10/2011 |
| JP | 2013-502807 A | 1/2013 |
| JP | 2013-524675 A | 6/2013 |
| KR | 1020060109844 A | 10/2006 |
| KR | 1020070077609 A | 7/2007 |
| KR | 10-2009-0081878 A | 7/2009 |
| RU | 2316909 C2 | 2/2008 |
| RU | 2342804 C2 | 12/2008 |
| WO | 2006/112653 A1 | 10/2006 |
| WO | 2010/002214 A2 | 1/2010 |
| WO | 2011/021838 A2 | 2/2011 |

OTHER PUBLICATIONS

Peng X et al: "Improve intra frame coding by PU/TU reordering", 94. MPEG Meeting; Oct. 11, 2010-Oct. 15, 2010; Guangzhou; (Motion Picture Expert Group or ISO/IEC JTC1/SC29/WG11) No. M18318, Oct. 28, 2010 (Oct. 28, 2010), XP030046908, pp. 1-4.
Wiegand T et al: "BoG report: residual quadtree structure", 94. MPEG Meeting; Oct. 11, 2010-Oct. 15, 2010; Guangzhou; (Motion Picture Expert Group or ISO/IEC JTC1/SC29/WG11) No. M18590, Oct. 28, 2010 (Oct. 28, 2010), XP030047180, pp. 1-17.
Communication dated Oct. 11, 2013, issued by the Australian Patent Office in counterpart Australian Application No. 2011239130.
Communication dated Jan. 20, 2014, issued by the Russian Federal Service for Intellectual Property in counterpart Russian Application No. 2012146757.
Communication dated Sep. 19, 2014, issued by the Russian Federal Service for Intellectual Property in counterpart Russian Application No. 2012146757.
Communication dated Oct. 27, 2014, issued by the Australian Patent Office in counterpart Australian Application No. 2011239130.
Communication from the European Patent Office dated Jul. 5, 2013 in counterpart European Application No. 11766126.4.
http://web.archive.org/web/20100305134542/http://en.wikipedia.org/wiki/Canny_edge_detector.
Communication dated Apr. 1, 2015, issued by the State Intellectual Property Office of P.R. China in counterpart Chinese Application No. 201180027802.6.
Communication dated Sep. 8, 2015 issued by the Japanese Patent Office in counterpart Japanese Patent Application No. 2013-503669.
Communication dated Jul. 7, 2015 issued by the European Patent Office in counterpart European Patent Application No. 15160767.8.
Communication dated Jul. 8, 2015 issued by the European Patent Office in counterpart European Patent Application No. 15160769.4.
Communication dated Jul. 8, 2015 issued by the European Patent Office in counterpart European Patent Application No. 15160770.2.
Communication dated Jul. 13, 2015 issued by the European Patent Office in counterpart European Patent Application No. 15160768.6.
Park et al.; "Selective Intra Prediction Mode Decision for H.264/AVC Encoders"; International Journal of Computer, Electrical, Automation, Control and Information Engineering; vol. 2; No. 1; 2008; 10 pages total.
Lee et al.; "Intra Prediction Method Based on the Linear Relationship between the Channels for YUV 4:2:0 Intra Coding"; Image Processing (ICIP); 2009 16th IEEE International Conference; Nov. 7, 2009; 4 pages total; XP031628426.
Kim et al.; "Fast intra-mode decision in H.264 video coding using simple directional masks"; Visual Communications and Image Processing; Jul. 12, 2005; 9 pages total; XP030080949.
Kim et al.; "New intra chroma prediction using inter-channel correlation"; Joint Collaborative Team on Video Coding (JCT-VC) of ITU-T SG16 WP3 and ISO/IEC JTC1/SC29/WG11; Jul. 23, 2010; 9 pages total; XP030007601.

(56) References Cited

OTHER PUBLICATIONS

Chen et al.; "CE6.A.4: Chroma intra prediction by reconstructed luma samples"; Joint Collaborative Team on Video Coding (JCT-VS) of ITU-T SG16 WP3 and ISO/IEC JTC1/SC29/WG11; Mar. 19, 2011; 10 pages total; XP030048360.
Chen et al.; "CE6.a: Chroma intra prediction by reconstructed luma samples"; Joint Collaborative Team on Video Coding (JCT-VC) of ITU-T SG16 WP3 and ISO/IEC JTC1/SC29/WG11; Jan. 20, 2011; 7 pages total; XP030047683.
Communication issued on Jan. 18, 2016 by the State Intellectual Property Office of PR China in related Application No. 201510175694.7.
Communication issued on Jan. 20, 2016 by the Korean Intellectual Property Office in related Application No. 10-2014-0148755.
Communication issued on Jan. 20, 2016 by the Korean Intellectual Property Office in related Application No. 10-2015-0034010.
Communication issued on Jan. 20, 2016 by the Korean Intellectual Property Office in related Application No. 10-2015-0034011.
Communication issued on Jan. 20, 2016 by the Korean Intellectual Property Office in related Application No. 10-2015-0034012.
Communication issued on Jan. 20, 2016 by the Korean Intellectual Property Office in related Application No. 10-2015-0034013.
Communication dated Apr. 13, 2016, issued by the Canadian Intellectual Property Office in counterpart Canadian Application No. 2,884,537.
Communication dated May 5, 2016, issued by the Russian Patent Office in counterpart Russian Application No. 2014153750.
Communication dated May 5, 2016, issued by the Russian Patent Office in counterpart Russian Application No. 2014153851.
Communication dated May 5, 2016, issued by the Russian Patent Office in counterpart Russian Application No. 2014153752.
Communication dated May 5, 2016, issued by the Russian Patent Office in counterpart Russian Application No. 2014153849.
Communication dated Jun. 13, 2016, issued by the State Intellectual Property Office of P.R. China in counterpart Chinese Application No. 201180027802.6.
Communication dated Jun. 14, 2016, issued by the Japanese Patent Office in counterpart Japanese Application No. 2015-95268.
Communication dated Jun. 21, 2016, issued by the Japanese Patent Office in counterpart Japanese Application No. 2015-95269.
Communication dated Jun. 21, 2016, issued by the Japanese Patent Office in counterpart Japanese Application No. 2015-95270.
Communication dated Jun. 21, 2016, issued by the Japanese Patent Office in counterpart Japanese Application No. 2015-95271.
Impress standard text series, CH.265/HEVC textbook, first edition, Oct. 21, 2013, Impress Japan, pp. 115-124, 172, 173, 178, 238, and 239, ISBN: 978-4-8443-3468-2 (23 pages total).
HEVC/CH.265 encoding scheme, broadcast technology, May 2013 (vol. 66, No. 5), May 1, 2013, pp. 146-154, ISSN: 0287-8658 (14 pages total).
Drugeon, V., et.al., "High Precision Edge Prediction for Intra Coding", Proceedings of the 15th IEEE Int. Conf. on Image Processing 2008 (ICIP 2008), Oct. 2008, p. 1620-1623, ISBN:978-1-4244-1765-0 (8 pages total).
Communication dated Jul. 13, 2016, issued by the Canadian Intellectual Property Office in counterpart Canadian Application No. 2,884,205.
Communication dated Jul. 27, 2016, issued by the Korean Intellectual Property Office in counterpart Korean Application No. 10-2014-0148755.
Communication dated Jul. 27, 2016, issued by the Korean Intellectual Property Office in counterpart Korean Application No. 10-2015-0034010.
Communication dated Jul. 27, 2016, issued by the Korean Intellectual Property Office in counterpart Korean Application No. 10-2015-0034011.
Communication dated Jul. 27, 2016, issued by the Korean Intellectual Property Office in counterpart Korean Application No. 10-2015-0034012.
Communication dated Jul. 27, 2016, issued by the Korean Intellectual Property Office in counterpart Korean Application No. 10-2015-0034013.
Tabatabai et al., "HM2 Chroma Intra Coding Description", [online], Mar. 14, 2011, Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010; Document: JCTVC-E395 (version 2), WG11 No. m19931, [searched on Oct. 5, 2016], Internet <URL : http://phenix.it-sudparis.eu/jct/doc_end_user/documents/5_Geneva/wg11/JCTVC-E395-v2.zip> (7 pages total).
Communication dated Oct. 11, 2016 issued by the Japanese Patent Office in counterpart Japanese Patent Application No. 2015-095268.
Communication dated Oct. 11, 2016 issued by the Japanese Patent Office in counterpart Japanese Patent Application No. 2015-095269.
Communication dated Oct. 11, 2016 issued by the Japanese Patent Office in counterpart Japanese Patent Application No. 2015-095270.
Communication dated Oct. 18, 2016 issued by the Japanese Patent Office in counterpart Japanese Patent Application No. 2015-095271.
Communication dated Oct. 24, 2016 issued by the State Intellectual Property Office of P.R. China in counterpart Chinese Patent Application No. 201510175694.7.
Communication dated Nov. 14, 2017, from the State Intellectual Property Office of People's Republic of China in counterpart Application No. 201510173765.X.
Communication dated Dec. 29, 2017, from the State Intellectual Property Office of People's Republic of China in counterpart Application No. 201510175162.3.
Communication dated Dec. 29, 2017, from the State Intellectual Property Office of People's Republic of China in counterpart Application No. 201510173807.X.
Communication dated Jan. 5, 2018, from the European Patent Office in counterpart European Application No. 17188268.1.
Thomas Weigand et al. "WD1: Working Draft 1 of High-Efficiency Video Coding" Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010 (137 pages total) XP030008032, Document JCTVC-C403.
TK Kan "TE5: Results for Simplification of Unified Intra Prediction" Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010 (4 pages total) XP030046653, Document JCTVC-C042.
Communication dated Dec. 12, 2017, from the Japanese Patent Office in counterpart application No. 2017-002772.
Thomas Weigand et al. "WD3: Working Draft 3 of High-Efficiency Video Coding" Joint Collaborative Team on Video Coding (JCT-VC) of ITU-T SG16 WP3 and ISO/IEC JTC1/SC29/WG11, 5th Meeting: Geneva, CH, Mar. 16-23, 2011 (17 pages total) Document JCTVC-E603.
L. Dong et al. "Improved Chroma Intra Mode Signaling" Joint Collaborative Team on Video Coding (JCT-VC) of ITU-T SG16 WP3 and ISO/IEC JTC1/SC29/WG11, 4th Meeting: Daegu, KR, Jan. 20-28, 2011 (6 pages total) Document JCTVC-D255.

\* cited by examiner

FIG. 7
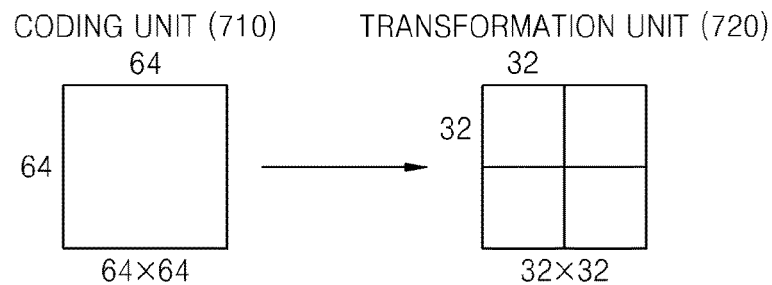
FIG. 8
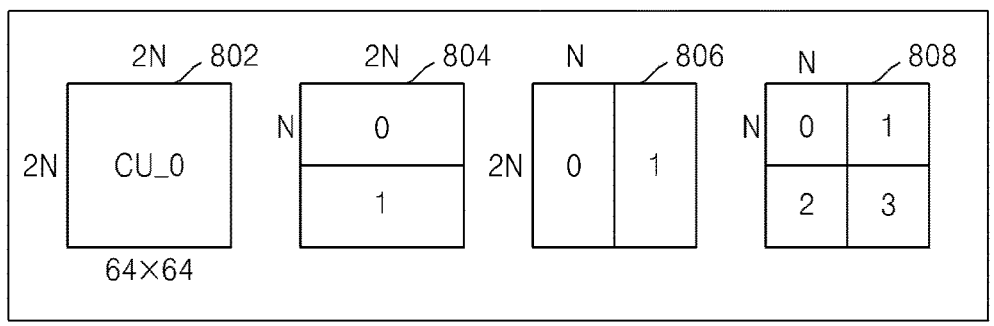
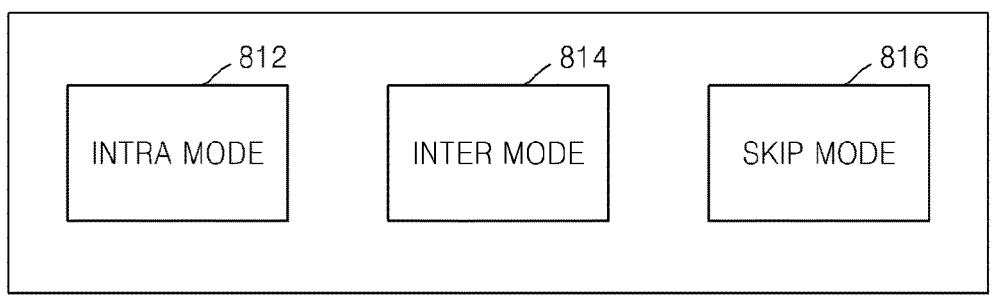
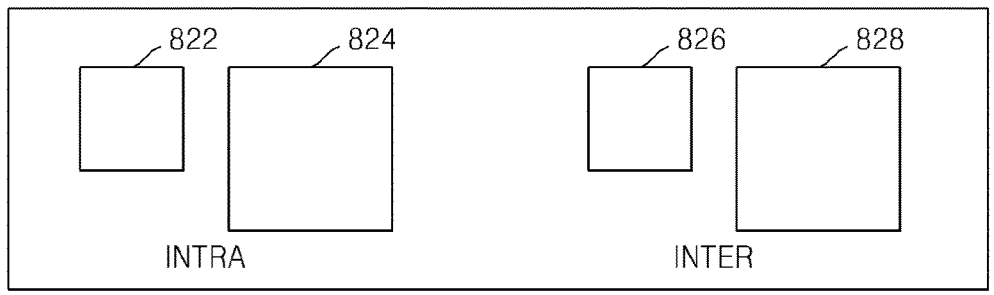

FIG. 11

| SPLIT X | | | | SPLIT ○ |
|---|---|---|---|---|
| ENCODE IN CURRENT DEPTH | | | | SPLIT IN LOWER DEPTH |
| SPLIT TYPE | PREDICTION MODE | SIZE OF TRANSFORMATION UNIT | | INDEPENDENT ENCODING FOR EACH ENCODING UNIT (NxN) OF LOWER DEPTH |
| 2Nx2N | INTRA | INTRA | SIZE OF FIRST INTRA TRANSFORMATION UNIT | |
| 2NxN | INTER | | SIZE OF SECOND INTRA TRANSFORMATION UNIT | |
| Nx2N | SKIP (ONLY 2Nx2N) | INTER | SIZE OF FIRST INTER TRANSFORMATION UNIT | |
| NxN | | | SIZE OF SECOND INTER TRANSFORMATION UNIT | |

4:4:4 FORMAT

| SIZE OF CODING UNIT | NUMBER OF PREDICTION MODES | | |
| --- | --- | --- | --- |
| | Example 1 | Example 2 | Example 3 |
| 2 | – | 5 | 5 |
| 4 | 9 | 9 | 9 |
| 8 | 9 | 9 | 9 |
| 16 | 33 | 17 | 11 |
| 32 | 33 | 33 | 33 |
| 64 | 5 | 5 | 9 |
| 128 | 5 | 5 | 5 |

| PREDICTION MODE | NAME |
|---|---|
| 0 | VERTICAL |
| 1 | HORIZONTAL |
| 2 | DC |
| 3 | DOWN_LEFT |
| 4 | DOWN_RIGHT |
| 5 | VERTICAL_RIGHT |
| 6 | HORIZONTAL_DOWN |
| 7 | VERTICAL_LEFT |
| 8 | HORIZONTAL_UP |

PREDICTION MODE DIRECTION

FIG. 15
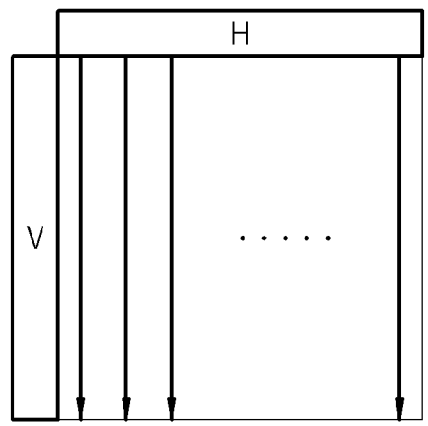
0 (VERTICAL)
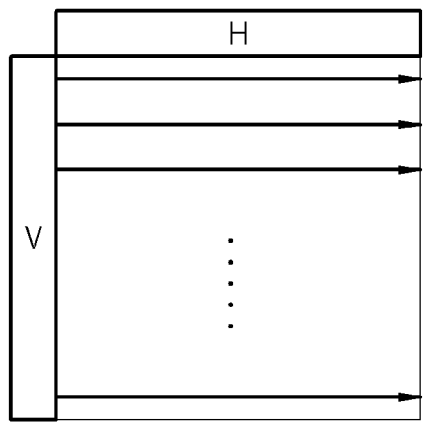
1 (HORIZONTAL)
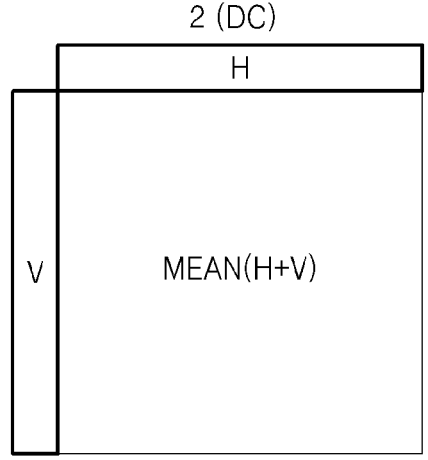
2 (DC)
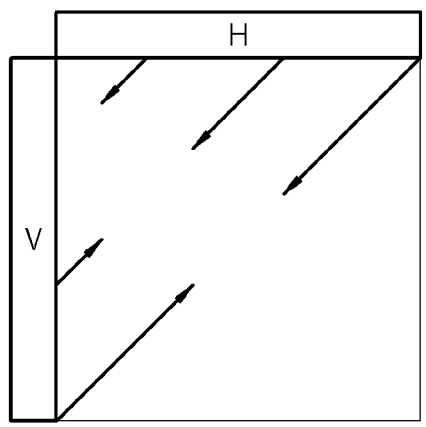
3 (PLANE)
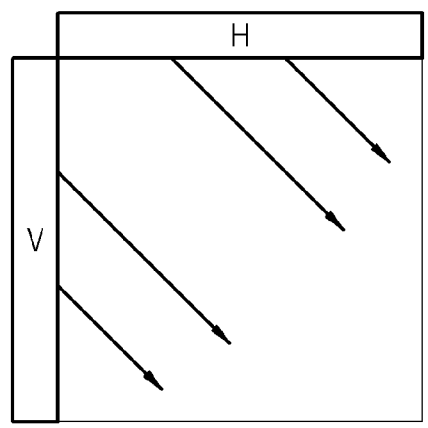
4 (DOWN RIGHT)

■ : NEIGHBORING PIXEL

REPRESENTATIVE INTRA PREDICTION MODES

DETERMINING INTRA PREDICTION MODE OF IMAGE CODING UNIT AND IMAGE DECODING UNIT

CROSS-REFERENCE TO RELATED PATENT APPLICATION

This application is a continuation application of U.S. patent application Ser. No. 15/486,458, filed on Apr. 13, 2017, in the U.S. Patent and Trademark Office, which is a continuation application of U.S. patent application Ser. No. 14/597,724, filed on Jan. 15, 2015, in the U.S. Patent and Trademark Office, now U.S. Pat. No. 9,667,974, issued on May 30, 2017, which is a continuation application of U.S. patent application Ser. No. 13/969,871, filed on Aug. 19, 2013, in the U.S. Patent and Trademark Office, now U.S. Pat. No. 8,964,840, issued on Feb. 24, 2015, which is a continuation application of U.S. patent application Ser. No. 13/080,021, filed on Apr. 5, 2011, in the U.S. Patent and Trademark Office, now U.S. Pat. No. 8,619,858 issued on Dec. 31, 2013, which claims priority from Korean Patent Application No. 10-2010-0031145, filed on Apr. 5, 2010, in the Korean Intellectual Property Office, the disclosures of which are incorporated herein by reference in their entireties.

BACKGROUND

1. Field

Exemplary embodiments relate to encoding and decoding of an image, and more particularly, to methods and apparatuses for encoding and decoding an image, wherein intra prediction is performed on a chrominance component coding unit by applying an intra prediction mode determined for a luminance component coding unit.

2. Description of the Related Art

In an image compression method, such as Moving Picture Experts Group (MPEG)-1, MPEG-2, MPEG-4, or H.264/MPEG-4 Advanced Video Coding (AVC), a picture is divided into macroblocks to encode an image. Each of the macroblocks is encoded in all encoding modes that can be used in inter prediction or intra prediction, and then is encoded in an encoding mode that is selected according to a bit rate used to encode the macroblock and a distortion degree of a decoded macroblock based on the original macroblock.

As hardware for reproducing and storing high resolution or high quality video content is being developed and supplied, there is an increasing need for a video codec capable of effectively encoding or decoding the high resolution or high quality video content. In a conventional video codec, a video is encoded in units of macroblocks each having a predetermined size.

SUMMARY

The exemplary embodiments include a method of determining an intra prediction mode of a luminance component coding unit having various directionality based on hierarchical coding units having various sizes, and methods and apparatuses for encoding and decoding an image, wherein intra prediction is performed on a chrominance component coding unit according to candidate intra prediction modes including an intra prediction mode determined for a luminance component coding unit.

According to an aspect of an exemplary embodiment, there is provided a method of determining an intra prediction mode of a coding unit of a current picture, the method comprising: splitting a luminance component of the current picture into at least one luminance component coding unit based on a maximum coding unit that is a coding unit in which the current picture is encoded having a maximum size, and a depth that indicates hierarchical split information of the maximum coding unit; determining an intra prediction mode of the at least one luminance component coding unit; comparing costs of applying to a chrominance component unit candidate intra prediction modes of the chrominance component coding unit and the intra prediction mode of the at least one luminance component coding unit; and determining an intra prediction mode of the chrominance component coding unit from among the candidate prediction modes of the chrominance component unit and the determined intra prediction mode of the at least one luminance component coding unit having a minimum cost, based on a result of the comparing.

According to an aspect of an exemplary embodiment, there is provided an apparatus for determining an intra prediction mode of a coding unit of a current picture, the apparatus comprising: a luminance intra predictor that determines an intra prediction mode of a luminance component coding unit that is split from a maximum coding unit that is a coding unit in which the current picture is encoded having a maximum size, and a depth that indicates hierarchical split information of the maximum coding unit; and a chrominance intra predictor that compares costs of applying to a chrominance component coding unit that is split from the maximum coding unit candidate intra prediction modes of the chrominance component coding unit and the intra prediction mode of the luminance component coding unit, and determines the intra prediction mode of the chrominance component coding unit from among the candidate prediction modes of the chrominance component unit and the intra prediction mode of the luminance component coding unit having a minimum cost, based on a result of the comparing.

According to an aspect of an exemplary embodiment, there is provided claim a method of determining an intra prediction mode of a decoding unit of a current picture, the method comprising: extracting a maximum coding unit that is a coding unit in which the current picture is encoded having a maximum size, and a depth that indicates hierarchical split information of the maximum coding unit, from a bitstream; splitting a luminance component and a chrominance component of the current picture to be decoded into at least one luminance component decoding unit and at least one chrominance component decoding unit, respectively, based on the maximum coding unit and depth; extracting intra prediction mode information that indicates an intra prediction mode applied to the at least one luminance component decoding unit and the at least one chrominance component decoding unit, from the bitstream; and performing intra prediction on the at least one luminance component decoding unit and the at least one chrominance component decoding unit based on the extracted intra prediction mode information to decode the at least one luminance component decoding unit and the at least one chrominance component decoding unit.

According to an aspect of an exemplary embodiment, there is provided an apparatus for decoding an image, the apparatus comprising: an entropy decoder that extracts a maximum coding unit that is a coding unit in which the current picture is encoded having a maximum size, a depth that indicates hierarchical split information of the maximum coding unit, and intra prediction mode information that indicates an intra prediction mode applied to a luminance component decoding unit and a chrominance component decoding unit to be decoded, from a bitstream; and an intra prediction performer that performs intra prediction on the luminance component decoding unit and the chrominance component decoding unit to decode the luminance component decoding unit and the chrominance component decoding unit, according to the extracted intra prediction mode.

BRIEF DESCRIPTION OF THE DRAWINGS

The above and other aspects will become more apparent by describing in detail exemplary embodiments thereof with reference to the attached drawings in which:

FIG. 7 is a diagram for describing a relationship between a coding unit and a transform unit, according to an exemplary embodiment;

FIG. 8 is a diagram for describing encoding information of coding units corresponding to a coded depth, according to an exemplary embodiment;

FIG. 11 is a table showing encoding information according to coding units, according to an exemplary embodiment;

FIG. 15 is a diagram for explaining intra prediction modes applied to a luminance component coding unit having a predetermined size, according to an exemplary embodiment;

DETAILED DESCRIPTION OF EXEMPLARY EMBODIMENTS

Hereinafter, the exemplary embodiments will be described more fully with reference to the accompanying drawings.

Hereinafter, a 'coding unit' refers to an encoding data unit in which the image data is encoded at an encoder side, and an encoded data unit in which the encoded image data is decoded at a decoder side. Also, a 'coded depth' refers to a depth at which a coding unit is encoded.

Figure 1:
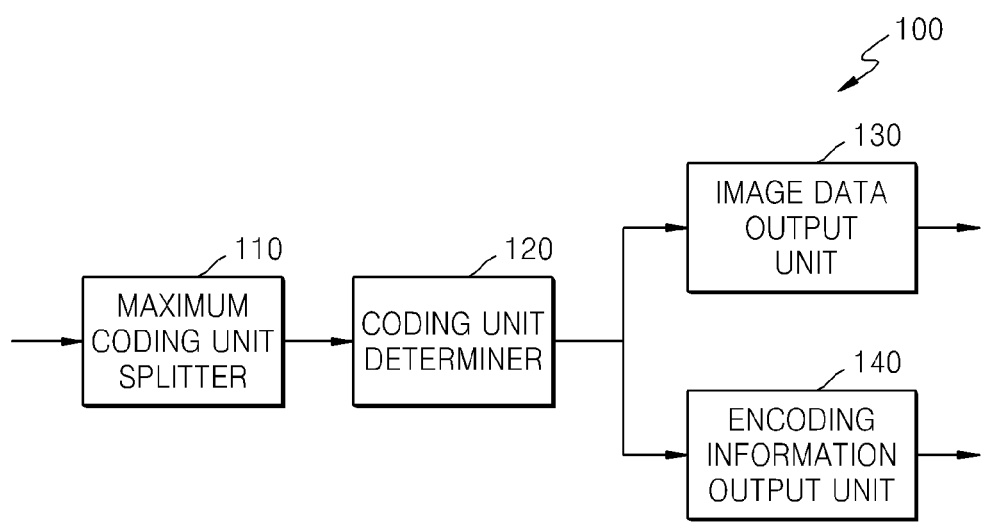
FIG. 1 is a block diagram of an apparatus for encoding a video, according to an exemplary embodiment.

FIG. 1 is a block diagram of a video encoding apparatus 100, according to an exemplary embodiment.

The video encoding apparatus 100 includes a maximum coding unit splitter 110, a coding unit determiner 120, an image data output unit 130, and an encoding information output unit 140.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined. Such a maximum coding unit and maximum depth may be set in a picture or a slice unit. In other words, different maximum coding units and different maximum depths may be set for each picture or slice, and a size of a minimum coding unit included in the maximum coding unit may be set according to the maximum depth. As such, by setting the maximum coding unit and the maximum depth according to pictures or slices, encoding efficiency may be improved by encoding an image of a flat region by using the maximum coding unit, and compression efficiency of an image may be improved by encoding an image having high complexity by using a coding unit having a smaller size than the maximum coding unit.

The coding unit determiner 120 determines different maximum depths according to maximum coding units. The maximum depth may be determined based on a rate-distortion (R-D) cost calculation. The determined maximum depth is output to the encoding information output unit 140, and the image data according to maximum coding units is output to the image data output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to a same depth in one maximum coding unit, it is determined whether to split each of the coding units corresponding to the same depth to a lower depth by measuring an encoding error of the image data of each coding unit, separately. Accordingly, even when image data is included in one maximum coding unit, the image data is split into regions according to the depths and the encoding errors may differ according to regions in the one maximum coding unit, and thus the coded depths may differ according to regions in the image data. In other words, the maximum coding unit may be split into coding units having different sizes according to different depths. Thus, one or more coded depths may be determined in one maximum coding unit, and the image data of the maximum coding unit may be split according to coding units of at least one coded depth.

Also, the coding units having different sizes in the maximum coding unit may be predicted or transformed based on data units having different sizes. In other words, the video encoding apparatus 100 may perform a plurality of operations for encoding an image based on data units having various sizes and shapes. In order to encode image data, operations such as prediction, transformation, entropy encoding, etc. are performed, and at this time, the same data unit may be used for all operations or different data units may be used for each operation.

For example, the video encoding apparatus 100 may select a data unit that is different from the coding unit, to predict the coding unit. For example, when a coding unit has a size of 2N×2N (where N is a positive integer), a data unit for prediction may have a size of 2N×2N, 2N×N, N×2N, or N×N. In other words, motion prediction may be performed based on a data unit obtained by splitting at least one of a height and a width of the coding unit. Hereinafter, the data unit that is a basis unit of prediction will be referred to as a "prediction unit".

A prediction mode may be at least one of an intra mode, an inter mode, and a skip mode, wherein a certain prediction mode is only performed on a prediction unit having a certain size or shape. For example, an intra mode may be performed only on a square prediction unit having a size of 2N×2N or N×N. Also, a skip mode may be performed only on a prediction unit having a size of 2N×2N. If a plurality of prediction units are included in the coding unit, prediction may be performed on each prediction unit to select a prediction mode having a minimum error.

Alternatively, the video encoding apparatus 100 may transform the image data based on a data unit that is different from the coding unit. In order to transform the coding unit, transformation may be performed based on a data unit having a size smaller than or equal to the coding unit. A data unit used as a base of the transformation will be referred to as a "transform unit".

The coding unit determiner 120 may measure an encoding error of deeper coding units according to depths by using Rate-Distortion Optimization based on Lagrangian multipliers, to determine a spilt shape of the maximum coding unit having an optimum encoding error. In other words, the coding unit determiner 120 may determine shapes of the coding units to be split from the maximum coding unit, wherein the sizes of the coding units are different according to depths.

The image data output unit 130 outputs the image data of the maximum coding unit, which is encoded based on the at least one coded depth determined by the coding unit determiner 120, in bitstreams. Since the encoding is already performed by the coding depth determiner 120 to measure the minimum encoding error, an encoded data stream may be output by using the minimum encoding error.

The encoding information output unit 140 may output information about the encoding mode according to coded depth, which is encoded based on the at least one coded depth determined by the coding unit determiner 120, in bitstreams. The information about the encoding mode according to coded depth may include information that indicates the coded depth, information that indicates split type in the prediction unit, information that indicates the prediction mode, and information that indicates the size of the transform unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the encoding information output unit 140 may assign corresponding encoding information to each minimum coding unit included in the maximum coding unit. In other words, the coding unit of the coded depth includes at least one minimum coding unit containing the same encoding information. Thus, if neighboring minimum coding units have the same encoding information, the neighboring minimum coding units may be the minimum coding units included in the same maximum coding unit.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum of 4 of the coding units of the lower depth.

Accordingly, the video encoding apparatus 100 may determine coding units having an optimum shape for each maximum coding unit, based on the size of the maximum coding unit and the maximum depth determined considering characteristics of the current picture. Also, since encoding may be performed on each maximum coding unit by using any one of various prediction modes and transforms, an optimum encoding mode may be determined considering characteristics of the coding unit of various image sizes.

Thus, if an image having high resolution or a large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
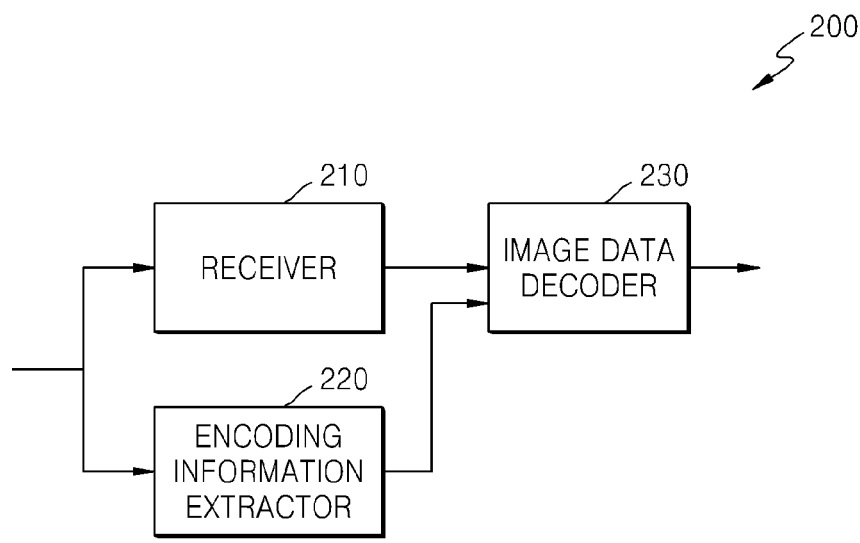
FIG. 2 is a block diagram of an apparatus for decoding a video, according to an exemplary embodiment.

FIG. 2 is a block diagram of a video decoding apparatus 200, according to an exemplary embodiment.

Referring to FIG. 2, the video decoding apparatus 200 includes a receiver 210, an encoding information extractor 220, and an image data decoder 230.

The receiver 210 receives and parses a bitstream received by the video decoding apparatus 200 to obtain image data according to maximum coding units, and outputs the image data to the image data decoder 230. The receiver 210 may extract information about the maximum coding unit of a current picture or slice from a header about the current picture or slice. The video decoding apparatus 200 decodes the image data according to maximum coding units.

The encoding information extractor 220 parses a bitstream received by the video decoding apparatus 200 and extracts information about a coded depth and encoding mode according to maximum coding units from the header of the current picture in the parsed bitstream. The information about the extracted coded depth and encoding mode are output to the image data decoder 230.

The information about the coded depth and the encoding mode according to the maximum coding unit may be set for information about at least one coding unit corresponding to the coded depth, and information about an encoding mode may include split type information of a prediction unit according to coding units, information that indicates a prediction mode, and information that indicates a size of a transform unit. Also, split information according to depths may be extracted as the information about the coded depth.

Information about a split shape of the maximum coding unit may include information about coding units having different sizes according to depths, and information about an encoding mode may include information that indicates a prediction unit according to coding units, information that indicates a prediction mode, and information that indicates a transform unit.

The image data decoder 230 restores the current picture by decoding the image data in each maximum coding unit based on the information extracted by the encoding information extractor 220. The image data decoder 230 may decode the coding unit included in the maximum coding unit based on the information about the split shape of the maximum coding unit. A decoding process may include prediction, including intra prediction and motion compensation, and inverse transform.

Alternatively, the image data decoder 230 restores the current picture by decoding the image data in each maximum coding unit based on the information about the coded depth and the encoding mode according to the maximum coding units. In other words, the image data decoder 230 may decode the image data according to coding units of at least one coded depth, based on the information about the coded depth according to the maximum coding units. A decoding process may include prediction, including intra prediction and motion compensation, and inverse transform.

The image data decoder 230 may perform intra prediction or motion compensation in a prediction unit and a prediction mode according to coding units, based on the information about the split type and the prediction mode of the prediction unit of the coding unit according to coded depths, to perform prediction according to coding units. Also, the image data decoder 230 may perform inverse transform according to each transform unit in the coding unit, based on the information about the size of the transform unit of the coding unit according to coded depths, to perform the inverse transform according to maximum coding units.

The image data decoder 230 may determine a coded depth of a current maximum coding unit by using split information according to depth. If the split information indicates decoding be performed at the current depth, the current depth is a coded depth. Accordingly, the image data decoder 230 may decode encoded image data of a coding unit of the current depth with respect to the image data of the current maximum coding unit by using the information about the split type of the prediction unit, the prediction mode, and the size of the transform unit. In other words, the encoding information assigned to the minimum coding unit may be observed, and the minimum coding units including the encoding information having the same split information may be gathered to be decoded in one data unit.

The video decoding apparatus 200 may obtain information about at least one coding unit that generates the minimum encoding error when encoding is recursively performed for each maximum coding unit, and may use the information to decode the current picture. In other words, the image data may be decoded in the optimum coding unit in each maximum coding unit. Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 3:
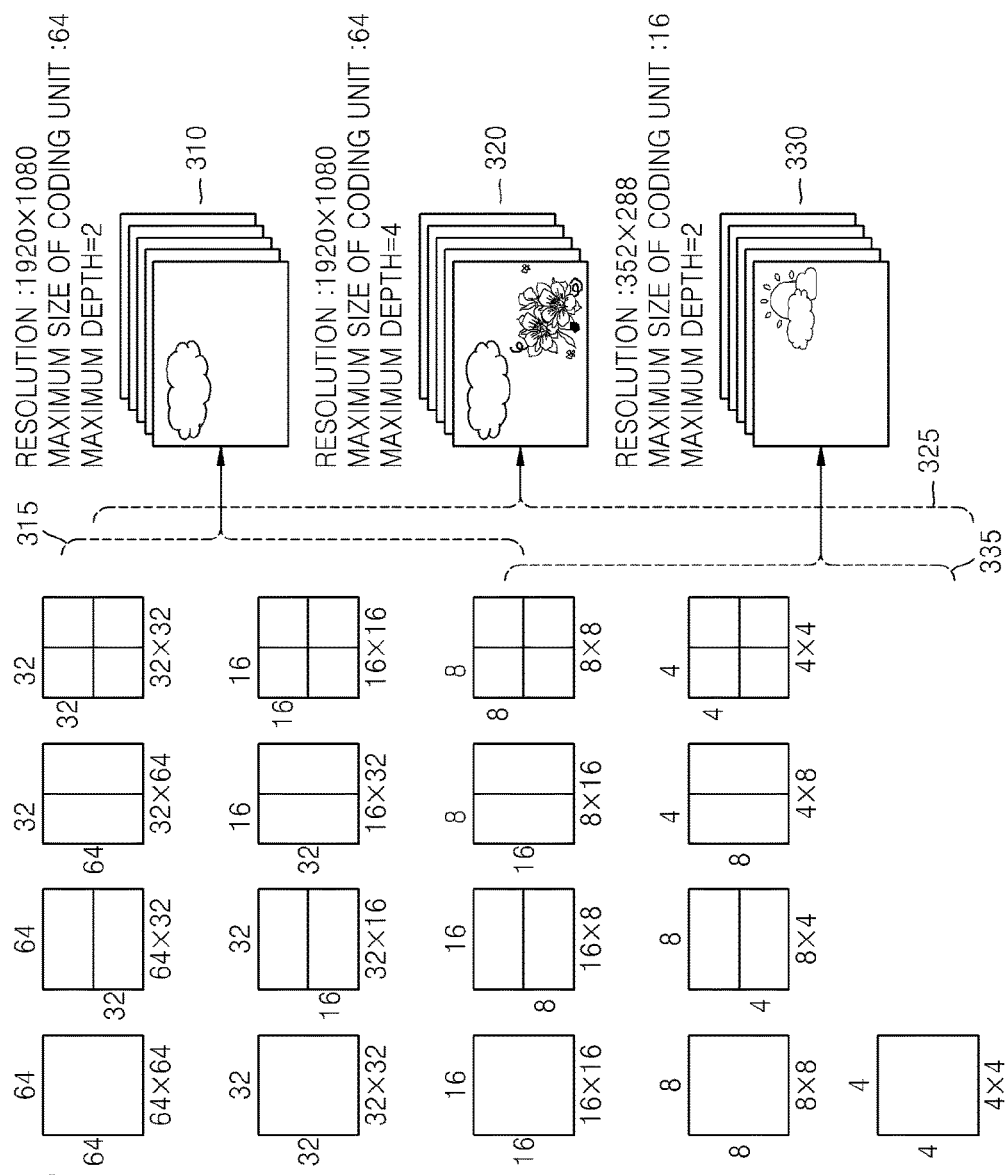
FIG. 3 is a diagram for describing a concept of coding units, according to an exemplary embodiment.

FIG. 3 is a diagram for describing a concept of coding units according to an exemplary embodiment.

Referring to FIG. 3, a size of a coding unit may be expressed in width×height, and may be 64×64, 32×32, 16×16, 8×8 and 4×4. Aside from the coding unit having a square shape, the coding unit may have a size of 64×32, 32×64, 32×16, 16×32, 16×8, 8×16, 8×4, or 4×8.

In video data 310, a resolution is 1920×1080, a maximum size of a coding unit is 64, and a maximum depth is 2. In video data 320, a resolution is 1920×1080, a maximum size of a coding unit is 64, and a maximum depth is 4. In video data 330, a resolution is 352×288, a maximum size of a coding unit is 16, and a maximum depth is 2.

If a resolution is high or a data amount is large, a maximum size of a coding unit may be large to not only increase encoding efficiency but also to accurately reflect characteristics of an image. Accordingly, the maximum size of the coding unit of the video data 310 and 320 having a higher resolution than the video data 330 may be 64.

The maximum depth denotes a total number of splits from a maximum coding unit to a minimum decoding unit. Accordingly, since the maximum depth of the video data 310 is 2, coding units 315 of the video data 310 may include a maximum coding unit having a long axis size of 64, and coding units having long axis sizes of 32 and 16 since depths are deepened by two layers by splitting the maximum coding unit twice. Meanwhile, since the maximum depth of the video data 330 is 2, coding units 335 of the video data 330 may include a maximum coding unit having a long axis size of 16, and coding units having long axis size of 8 and 4 since depths are deepened by two layers by splitting the maximum coding unit twice.

Since the maximum depth of the video data 320 is 4, coding units 325 of the video data 320 may include a maximum coding unit having a long axis size of 64, and coding units having long axis sizes of 32, 16, 8, and 4 since the depths are deepened by 4 layers by splitting the maximum coding unit four times. As a depth deepens, detailed information may be precisely expressed.

Figure 4:
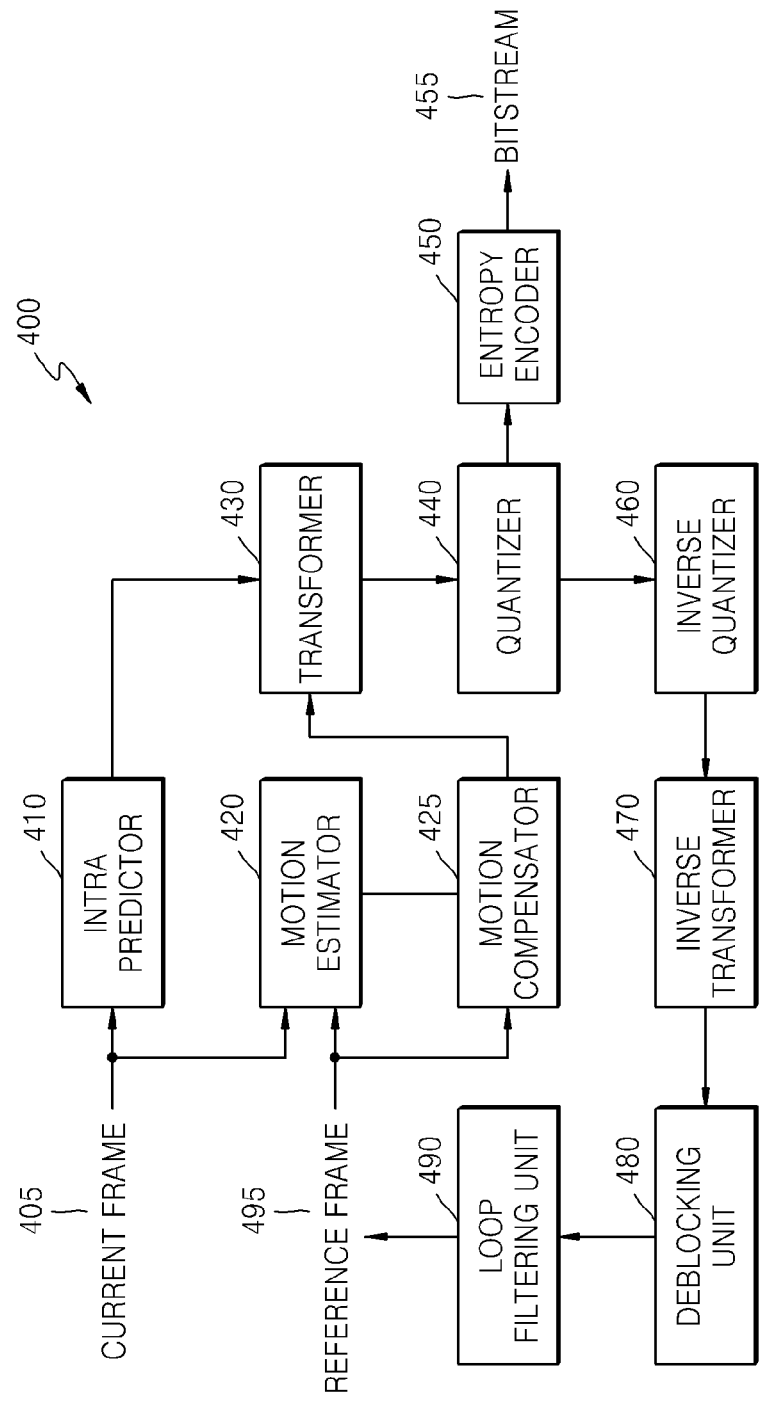
FIG. 4 is a block diagram of an image encoder based on coding units, according to an exemplary embodiment of the present invention.

FIG. 4 is a block diagram of an image encoder 400 based on coding units, according to an exemplary embodiment.

Referring to FIG. 4, an intra predictor 410 performs intra prediction on coding units in an intra mode, from among coding units of a current frame 405, and a motion estimator 420 and a motion compensator 425 performs inter estimation and motion compensation on coding units in an inter mode from among coding units of the current frame 405 by using the current frame 405, and a reference frame 495.

Data output from the intra predictor 410, the motion estimator 420, and the motion compensator 425 is output as a quantized transform coefficient through a transformer 430 and a quantizer 440. The quantized transform coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transform coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform image encoding processes based on the maximum coding unit, the coding unit according to depths, the prediction unit, and the transform unit. Specifically, the intra predictor 410, the motion estimator 420, and the motion compensator 425 determine a prediction unit and a prediction mode of a coding unit by considering a maximum size and depth of the coding unit, and the transformer 430 determines the size of the transform unit by considering the maximum size and depth of the coding unit. Also, as described later, the intra predictor 410 performs intra prediction by applying an intra prediction mode determined for a luminance component coding unit on a chrominance component coding unit, and thus prediction efficiency of the chrominance component coding unit may be improved.

Figure 5:
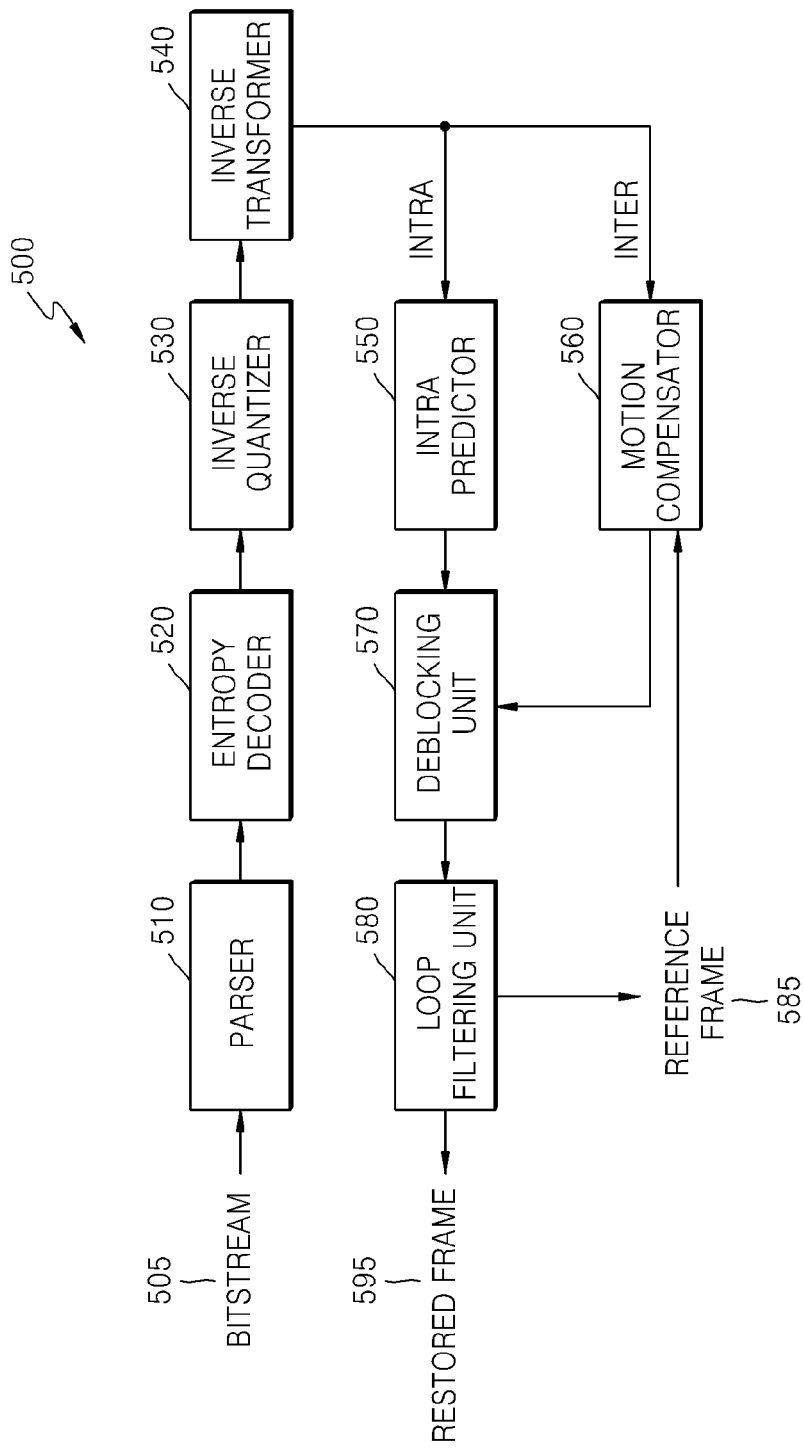
FIG. 5 is a block diagram of an image decoder based on coding units, according to an exemplary embodiment.

FIG. 5 is a block diagram of an image decoder 500 based on coding units, according to an exemplary embodiment.

Referring to FIG. 5, a parser 510 parses a received bitstream 505 and extracts encoded image data to be decoded and information about encoding required for decoding from the parsed bitstream. The encoded image data is output as inverse quantized data through an entropy decoder 520 and an inverse quantizer 530, and the inverse quantized data is restored to image data in a spatial domain through an inverse transformer 540. An intra predictor 550 performs intra prediction on coding units in an intra mode with respect to the image data in the spatial domain, and a motion compensator 560 performs motion compensation on coding units in an inter mode by using a reference frame 585. The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform image decoding processes based on the maximum coding unit, the coding unit according to depths, the prediction unit, and the transform unit. Specifically, the intra prediction 550 and the motion compensator 560 determine the prediction unit and the prediction mode of the coding unit by considering the maximum size and depth of the coding unit, and the inverse transformer 540 determines the size of transform unit by considering the maximum size and depth of the coding unit.

Figure 6:
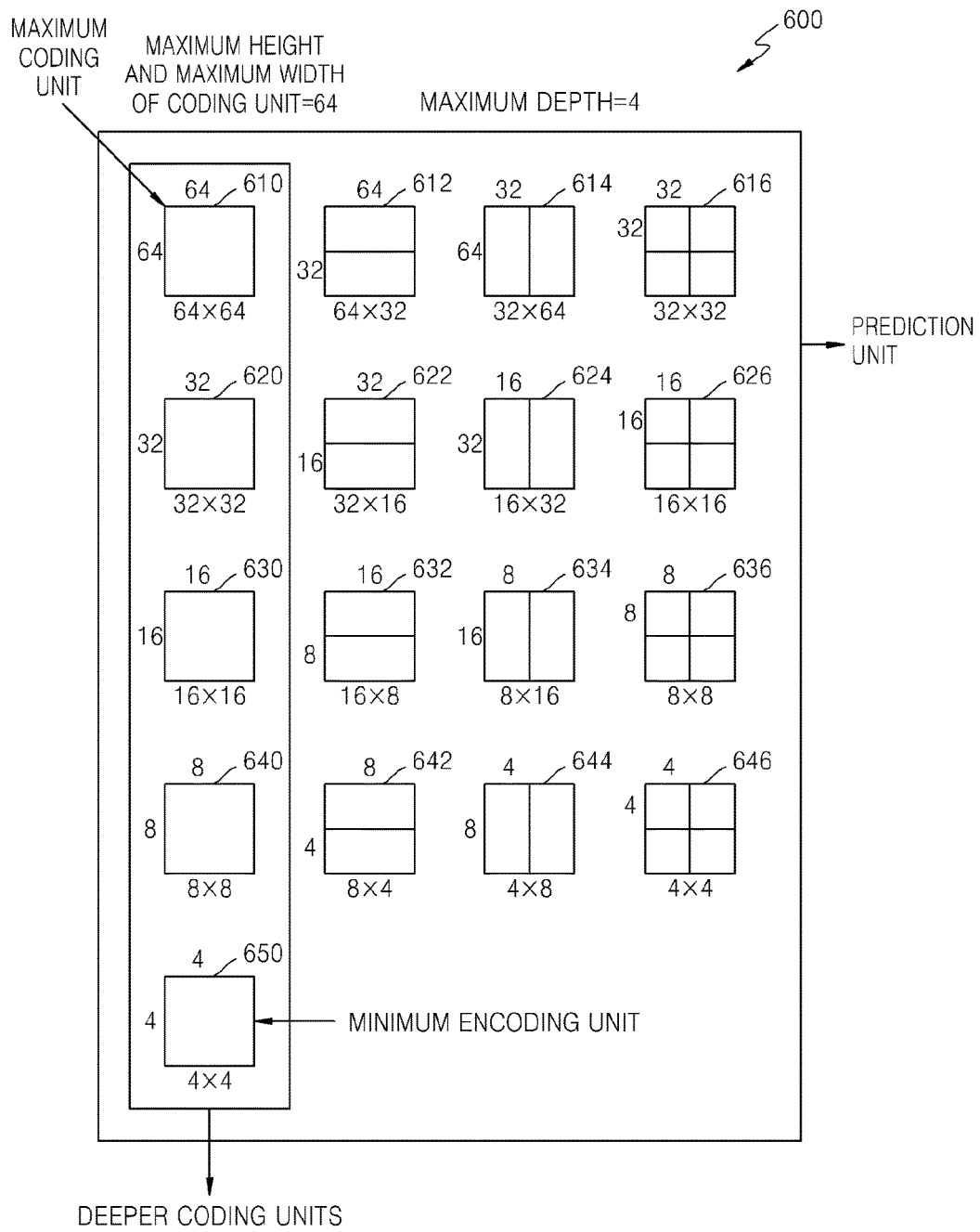
FIG. 6 is a diagram illustrating deeper coding units according to depths and prediction units, according to an exemplary embodiment.

FIG. 6 is a diagram illustrating deeper coding units according to depths, and prediction units according to an exemplary embodiment.

The video encoding apparatus 100 and the video decoding apparatus 200 use hierarchical coding units to consider characteristics of an image. A maximum height, a maximum width, and a maximum depth of coding units may be adaptively determined according to the characteristics of the image, or may be individually set according to an input of a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit constituting a partial data unit, which is a base for prediction encoding of each deeper coding unit, is shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

Partial data units are shown in FIG. 6 as the prediction units of a coding unit along the horizontal axis according to each depth. In other words, if the coding unit 610 having the size of 64×64 and the depth of 0 is a prediction unit, the prediction unit may be split into partial data units included in the encoding unit 610, i.e. a partial data unit 610 having a size of 64×64, partial data units 612 having the size of 64×32, partial data units 614 having the size of 32×64, or partial data units 616 having the size of 32×32.

A prediction unit of the coding unit 620 having the size of 32×32 and the depth of 1 may be split into partial data units included in the coding unit 620, i.e. a partial data unit 620 having a size of 32×32, partial data units 622 having a size of 32×16, partial data units 624 having a size of 16×32, and partial data units 626 having a size of 16×16.

A prediction unit of the coding unit 630 having the size of 16×16 and the depth of 2 may be split into partial data units included in the coding unit 630, i.e. a partial data unit having a size of 16×16 included in the coding unit 630, partial data units 632 having a size of 16×8, partial data units 634 having a size of 8×16, and partial data units 636 having a size of 8×8.

A prediction unit of the coding unit 640 having the size of 8×8 and the depth of 3 may be split into partial data units included in the coding unit 640, i.e. a partial data unit having a size of 8×8 included in the coding unit 640, partial data units 642 having a size of 8×4, partial data units 644 having a size of 4×8, and partial data units 646 having a size of 4×4.

The coding unit 650 having the size of 4×4 and the depth of 4 is the minimum coding unit and a coding unit of the lowermost depth. A prediction unit of the coding unit 650 is only assigned to a partial data unit having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a minimum encoding error may be determined for the current depth by performing encoding for each prediction unit in the coding units corresponding to the current depth, along the horizontal axis of the hierarchical structure 600. Also, a minimum encoding error according to depths may be searched for by comparing the minimum encoding error of each depth, by performing encoding for each depth as the depth deepens along the vertical axis of the hierarchical structure 600. A depth having the minimum encoding error in the coding unit 610 may be selected as the coded depth and a split type of the coding unit 610.

FIG. 7 is a diagram for describing a relationship between a coding unit 710 and transform units 720, according to an exemplary embodiment.

The video encoding apparatus 100 or 200 encodes or decodes an image according to coding units having sizes smaller than or equal to a maximum coding unit for each maximum coding unit. Sizes of transform units for transform during encoding may be selected based on data units that are not larger than a corresponding coding unit. For example, in the video encoding apparatus 100 or 200, if a size of the coding unit 710 is 64×64, transform may be performed by using the transform units 720 having a size of 32×32. Also, data of the coding unit 710 having the size of 64×64 may be encoded by performing the transform on each of the transform units having the size of 32×32, 16×16, 8×8, and 4×4, which are smaller than 64×64, and then a transform unit having the least coding error may be selected.

FIG. 8 is a diagram for describing encoding information of coding units corresponding to a coded depth, according to an exemplary embodiment.

The output unit 130 of the video encoding apparatus 100 may encode and transmit information 800 that indicates a split type, information 810 that indicates a prediction mode, and information 820 that indicates a size of a transform unit for each coding unit corresponding to a coded depth, as information about an encoding mode.

The information 800 includes information about a split type of a prediction unit of a current coding unit, wherein a split prediction unit is a data unit for prediction encoding the current coding unit. For example, a current coding unit CU_0 having a depth 0 and size of 2N×2N may be split into any one of a prediction unit 802 having a size of 2N×2N, a prediction unit 804 having a size of 2N×N, a prediction unit 806 having a size of N×2N, and a prediction unit 808 having a size of N×N. Here, the information 800 about a split type is set to indicate one of the prediction unit 804 having a size of 2N×N, the prediction unit 806 having a size of N×2N, and the prediction unit 808 having a size of N×N The information 810 indicates a prediction mode of each prediction unit. For example, the information 810 may indicate a mode of prediction encoding performed on a prediction unit indicated by the information 800, i.e., an intra mode 812, an inter mode 814, or a skip mode 816.

The information 820 indicates a transform unit to be based on when transform is performed on a current coding unit. For example, the transform unit may be a first intra transform unit 822, a second intra transform unit 824, a first inter transform unit 826, or a second intra transform unit 828.

Figure 9:
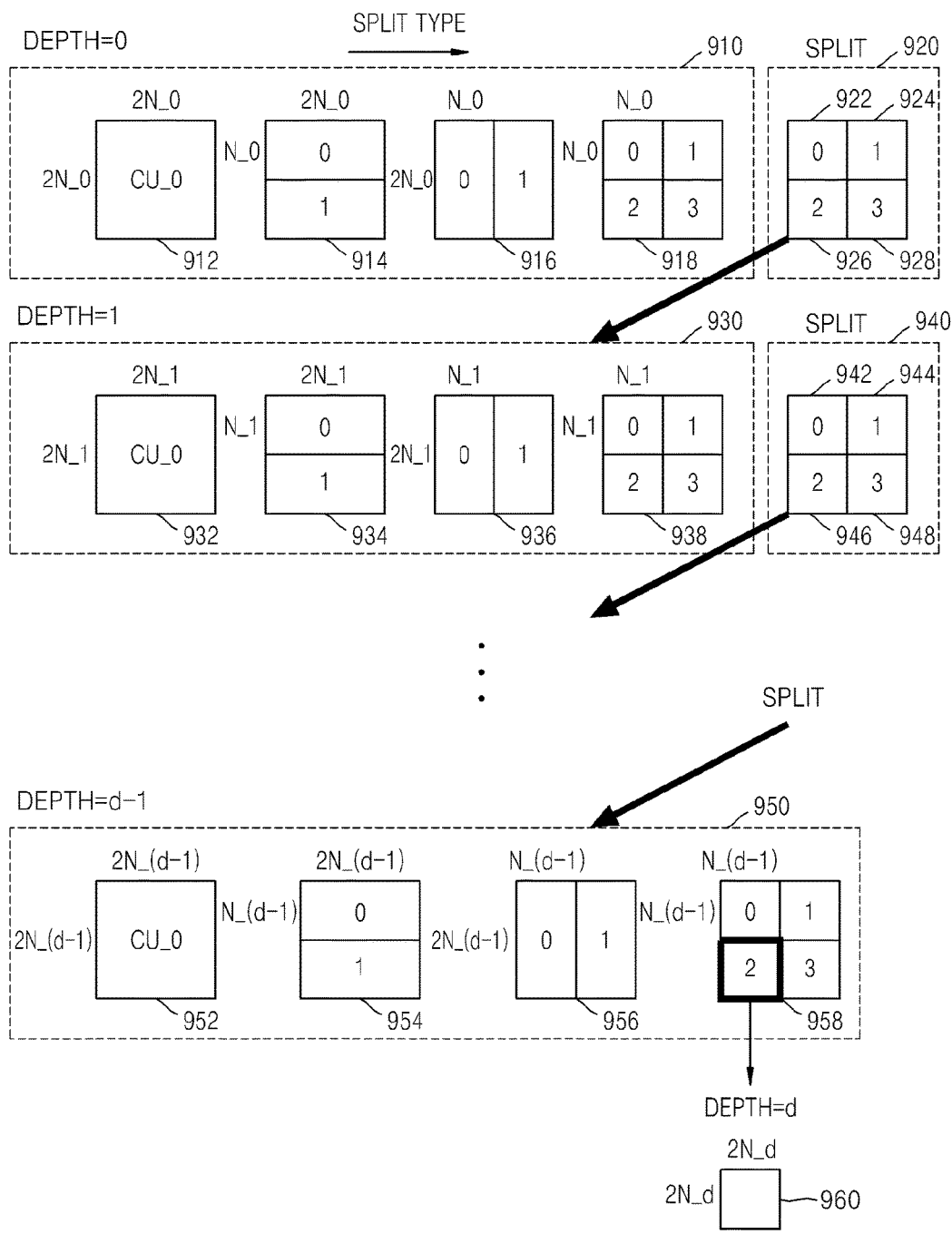
FIG. 9 is a diagram of deeper coding units according to depths, according to an exemplary embodiment.

The encoding information extractor 220 of the video decoding apparatus 200 may extract and use the information 800, 810, and 820 for decoding, according to each deeper coding unit FIG. 9 is a diagram of deeper coding units according to depths, according to an exemplary embodiment.

Split information may be used to indicate a change in depth. The spilt information indicates whether a coding unit of a current depth is split into coding units of a lower depth.

A prediction unit 910 for prediction encoding a coding unit having a depth of 0 and a size of 2N_0×2N_0 may include a split type 912 having a size of 2N_0×2N_0, a split type 914 having a size of 2N_0×N_0, a split type 916 having a size of N_0×2N_0, and a split type 918 having a size of N_0×N_0.

Encoding via motion prediction is repeatedly performed on one prediction unit having a size of 2N_0×2N_0, two prediction units having a size of 2N_0×N_0, two prediction units having a size of N_0×2N_0, and four prediction units having a size of N_0×N_0, according to each split type. The prediction in an intra mode and an inter mode may be performed on the prediction units having the sizes of 2N_0×N_0, N_0×2N_0 and N_0×N_0 and N_0×N_0. The motion prediction in a skip mode is performed only on the prediction unit having the size of 2N_0×2N_0.

If the encoding error is the smallest in the split type 918 having the size N_0×N_0, a depth is changed from 0 to 1 to split the partition type 918 in operation 920, and encoding is repeatedly performed on coding units 922, 924, 926, and 928 having a depth of 2 and a size of N_0×N_0 to search for a minimum encoding error.

Since the encoding is repeatedly performed on the coding units 922, 924, 926, and 928 having the same depth, only encoding of a coding unit having a depth of 1 will be described as an example. A prediction unit 930 for motion predicting a coding unit having a depth of 1 and a size of 2N_1×2N_1 (=N_0×N_0) may include a split type 932 having a size of 2N_1×2N_1, a split type 934 having a size of 2N_1×N_1, a split type 936 having a size of N_1×2N_1, and a split type 938 having a size of N_1×N_1. Encoding via motion prediction is repeatedly performed on one prediction unit having a size of 2N_1×2N_1, two prediction units having a size of 2N_1×N_1, two prediction units having a size of N_1×2N_1, and four prediction units having a size of N_1×N_1, according to each split type.

If an encoding error is the smallest in the split type 938 having the size of N_1×N_1, a depth is changed from 1 to 2 to split the split type 938 in operation 940, and encoding is repeatedly performed on coding units 942, 944, 946, and 948, which have a depth of 2 and a size of N_2×N_2 to search for a minimum encoding error.

When a maximum depth is d, split information according to each depth may be set up to when a depth becomes d−1. In other words, a prediction unit 950 for motion predicting a coding unit having a depth of d−1 and a size of 2N_(d−1)×2N_(d−1) may include a split type 952 having a size of 2N_(d−1)×2N_(d−1), a split type 954 having a size of 2N_(d−1)×N_(d−1), a split type 956 having a size of N_(d−1)×2N_(d−1), and a split type 958 having a size of N_(d−1)×N_(d−1).

Encoding via motion prediction may be repeatedly performed on one prediction unit having a size of 2N_(d−1)×2N_(d−1), two prediction units having a size of 2N_(d−1)×N_(d−1), two prediction units having a size of N_(d−1)×2N_(d−1), and four prediction units having a size of N_(d−1)×N_(d−1), according to each split type. Since the maximum depth is d, a coding unit 952 having a depth of d−1 is not split.

In order to determine a coded depth for the coding unit 912, the video encoding apparatus 100 selects a depth having the least encoding error by comparing encoding errors according to depths. For example, an encoding error of a coding unit having a depth of 0 may be encoded by performing motion prediction on each of the split types 912, 914, 916, and 918, and than a prediction unit having the least encoding error may be determined. Similarly, a prediction unit having the least encoding error may be searched for, according to depths 0 through d−1. In a depth of d, an encoding error may be determined by performing motion prediction on the prediction unit 960 having the size of 2N_d×2N_d. As such, the minimum encoding errors according to depths are compared in all of the depths of 1 through d, and a depth having the least encoding error may be determined as a coded depth. The coded depth and the prediction unit of the corresponding coded depth mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 912 to decode the coding unit 912. The video decoding apparatus 200 may determine a depth, in which split information is 0, as a coded depth by using split information according to depths, and use information about an encoding mode of the corresponding depth for decoding.

Figure 10A:
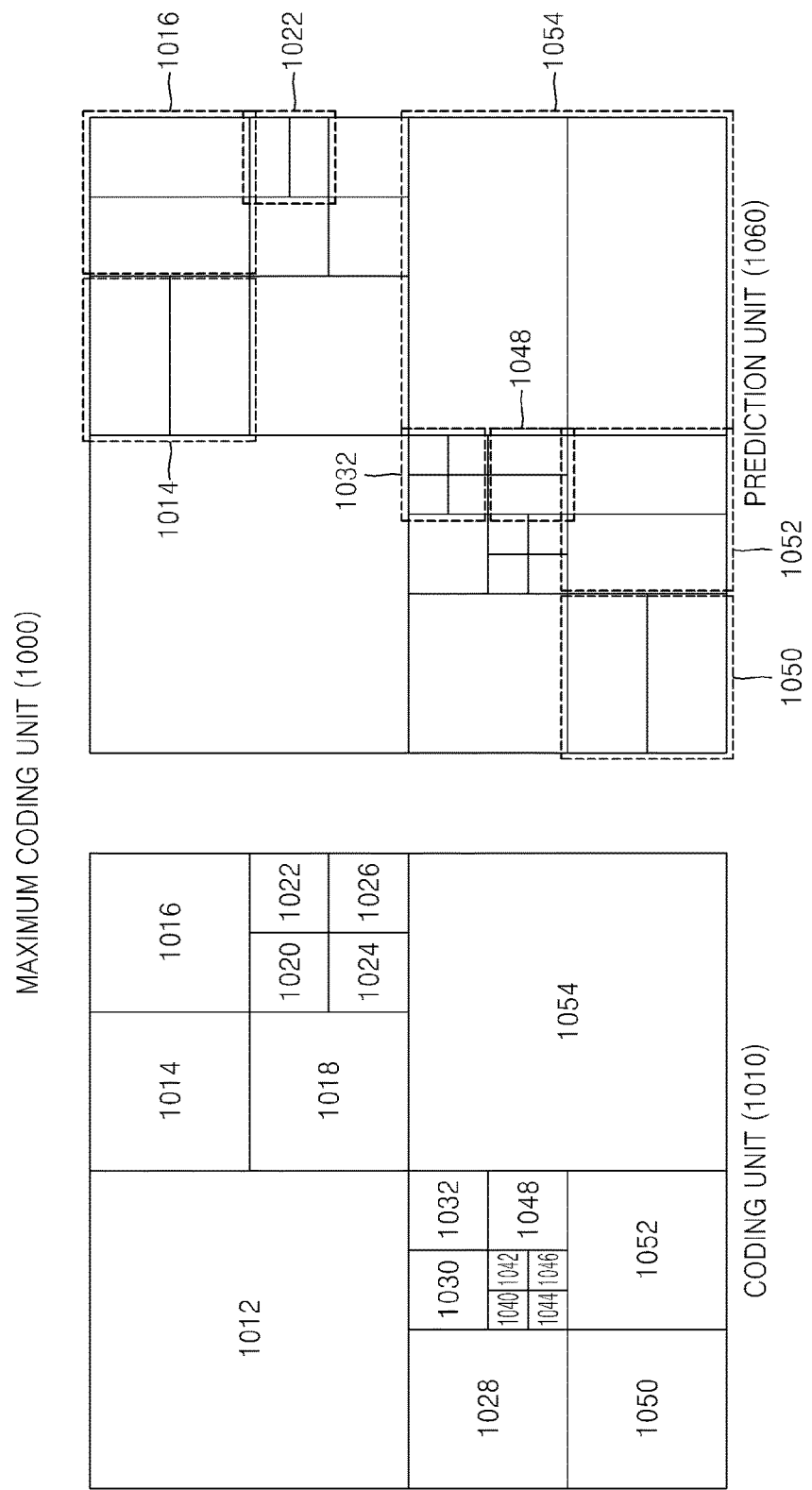
FIGS. 10A and 10B are diagrams for describing a relationship between coding units, prediction units, and transform units, according to an exemplary embodiment.
Figure 10B:
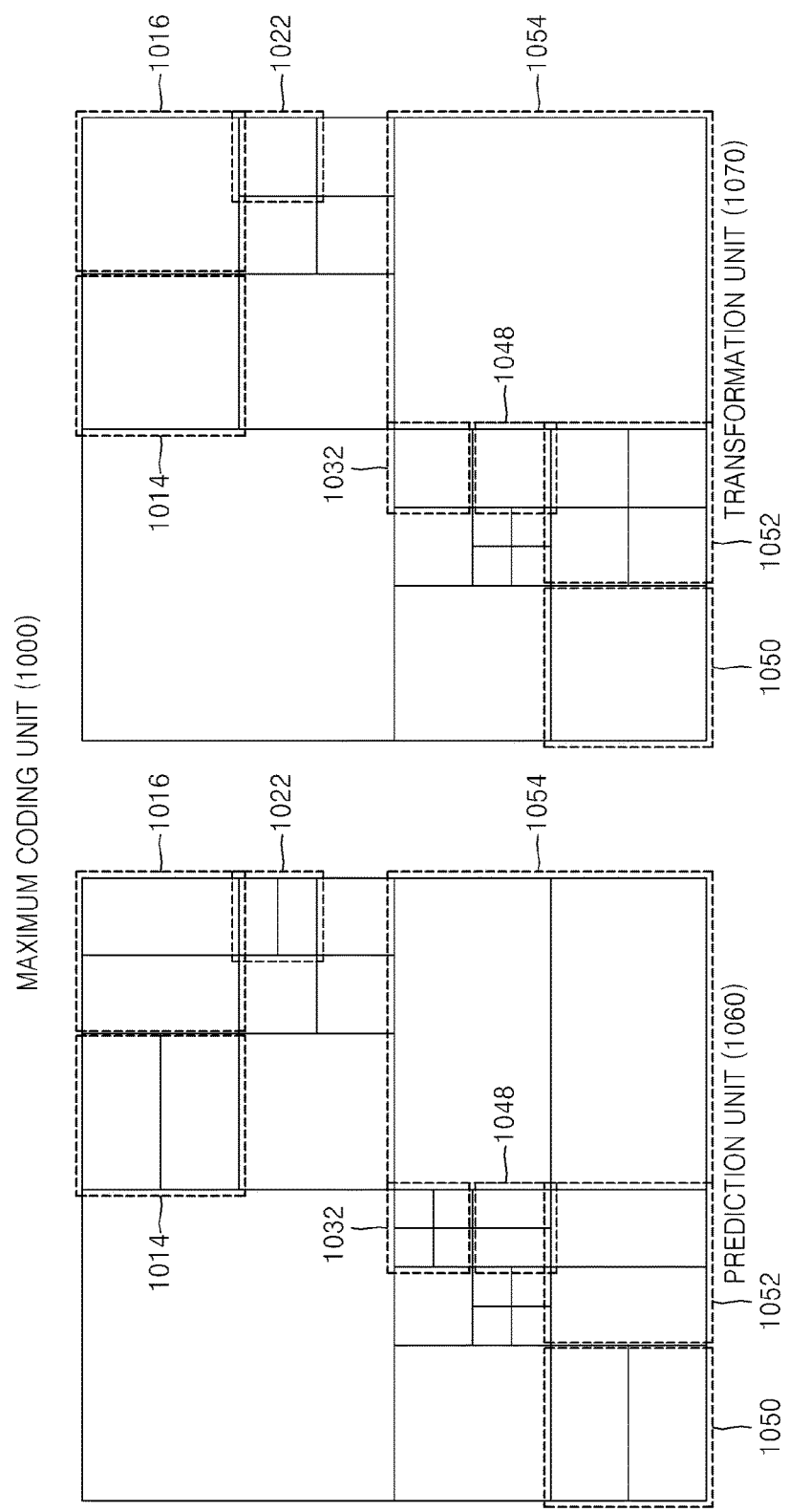

FIGS. 10A and 10B are diagrams for describing a relationship between coding units 1010, prediction units 1060, and transform units 1070, according to an exemplary embodiment.

The coding units 1010 are coding units corresponding to coded depths determined by the video encoding apparatus 100, in a maximum coding unit 1000. The prediction units 1060 are prediction units of each of the coding units 1010, and the transform units 1070 are transform units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, split types in the coding units 1014, 1022, 1050, and 1054 have a size of 2N×N, split types in the coding units 1016, 1048, and 1052 have a size of N×2N, and a split type of the coding unit 1032 has a size of N×N. Prediction units of the coding units 1010 are smaller than or equal to each coding unit.

Transform or inverse transform is performed on image data of the coding unit 1052 in the transform units 1070 in a data unit that is smaller than the coding unit 1052. Also, the coding units 1014, 1016, 1022, 1032, 1048, 1050, and 1052 in the transform units 1070 are different from those in the prediction units 1060 in terms of sizes and shapes. In other words, the video encoding and decoding apparatuses 100 and 200 may perform intra prediction, motion estimation, motion compensation, transform, and inverse transform individually on a data unit in the same coding unit.

FIG. 11 is a table showing encoding information according to coding units, according to an exemplary embodiment.

The encoding information output unit 140 of the video encoding apparatus 100 may encode the encoding information according to coding units, and the encoding information extractor 220 of the video encoding apparatus 200 may extract the encoding information according to coding units.

Encoding information may include split information about a coding unit, split type information, prediction mode information, and information about a size of a transform unit. The encoding information shown in FIG. 11 is merely exemplary of information that may be set by the video encoding apparatus 100 and the video decoding apparatus 200, and is not limited thereto.

The split information may indicate a coded depth of a corresponding coding unit. In other words, since a coded depth is a depth that is no longer split according to the split information, the information about split type, prediction mode, and size of transform unit may be set for the coded depth. If the current coding unit is further split according to the split information, encoding is independently performed on four split coding units of a lower depth.

The information about a split type may indicate a split type of a transform unit of a coding unit in a coded depth as one of 2N×2N, 2N×N, N×2N, and N×N. The prediction mode may indicate a motion prediction mode as one of an intra mode, an inter mode, and a skip mode. The intra mode may be defined only in the split types of 2N×2N and N×N, and the skip mode may be only defined in the split type of 2N×2N. The transform unit may have two sizes in the intra mode, and two sizes in the inter mode.

The encoding information according to coding units in the coded depth may be included in the minimum coding unit in the coding unit. Accordingly, by checking the encoding information included in the neighboring minimum coding units, it may be determined whether the neighboring minimum coding units are included in the coding units having the same coded depth. Also, since the coding unit of the corresponding coded depth may be determined by using the encoding information included in the minimum coding unit, distribution of the coded depths of the minimum coding units may be inferred.

Intra prediction performed by the intra prediction unit 410 of the video encoding apparatus 100 illustrated in FIG. 4 and the intra prediction unit 550 of the video decoding apparatus 200 illustrated in FIG. 5 will now be described in detail. In the following description, a coding unit refers to a current encoded block in an encoding process of an image, and a decoding unit refers to a current decoded block in a decoding process of an image. The coding unit and the decoding unit are different only in that the coding unit is used in the encoding process and the decoding unit is used in the decoding process. For consistency, except for a particular case, the coding unit and the decoding unit are referred to as a coding unit in both the encoding and decoding processes.

Figure 12A:
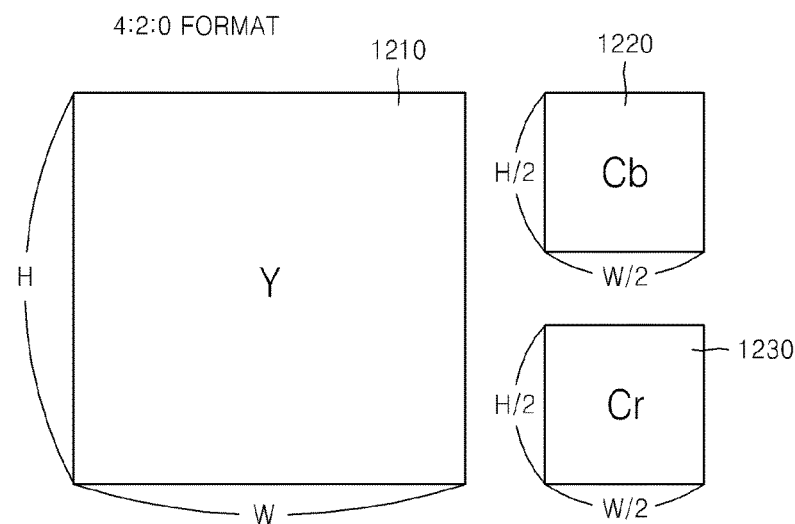
FIGS. 12A through 12C are diagrams of formats of a luminance component image and a chrominance component image, according to exemplary embodiments.
Figure 12B:
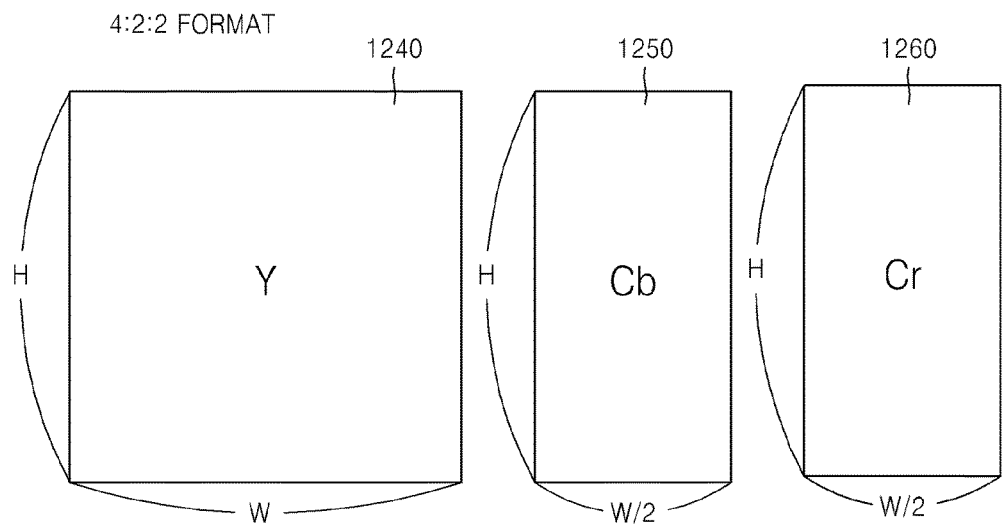
Figures 12C, 13:
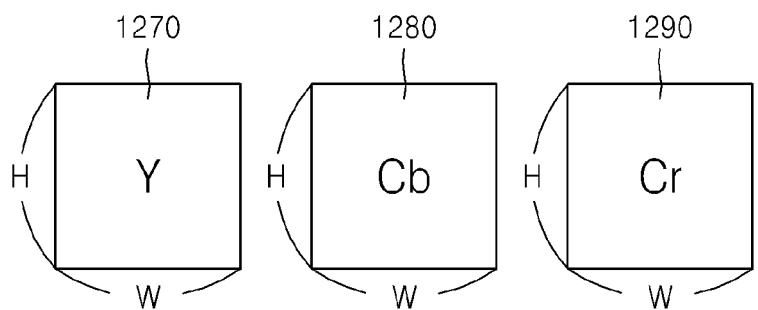
FIG. 13 is a table showing a number of intra prediction modes according to sizes of luminance component coding units, according to an exemplary embodiment.

FIGS. 12A through 12C are diagrams of formats of a luminance component image and a chrominance component image, according to an exemplary embodiment.

Each coding unit forming one frame may be expressed by using one of three components, i.e., Y, Cb, and Cr. Y is luminance data having luminance information, and Cb and Cr are chrominance data having chrominance information.

The chrominance data may be expressed using a lower amount of data than the luminance data, based on the premise that a person is generally more sensitive to the luminance information than the chrominance information. Referring to FIG. 12A, one coding unit having a 4:2:0 format includes luminance data 1210 having a size of H×W (H and W are positive integers), and two pieces of chrominance data 1220 and 1230 having a size of (H/2)×(W/2) obtained by sampling the chrominance components Cb and Cr by ¼. Referring to FIG. 12B, one coding unit having a 4:2:2 format includes luminance data 1240 having a size of H×W (H and W are positive integers), and two pieces of chrominance data 1250 and 1260 having a size of H×(W/2) obtained by sampling the chrominance components Cb and Cr by ½ in a horizontal direction. Also, referring to FIG. 12C, when one coding unit has a 4:4:4 format, the coding unit includes luminance data 1270, and chrominance data 1280 and 1290, each having a size of H×W without sampling the chrominance components Cb and Cr, to precisely express a chrominance component image.

Hereinafter, it is assumed that the luminance component coding unit and the chrominance component coding unit, which are intra predicted, are one of image signals having color formats of 4:2:0, 4:2:2, and 4:4:4 defined in a YCbCr (or YUV) color domain.

Prediction efficiency of the chrominance coding unit is improved by including an intra prediction mode determined for the luminance component coding unit in candidate intra prediction modes applied to the chrominance component coding unit by considering a relationship between the luminance component and the chrominance component.

FIG. 13 is a table showing a number of intra prediction modes according to sizes of luminance component coding units, according to an exemplary embodiment.

According to an exemplary embodiment, the number of intra prediction modes to be applied to a luminance component coding unit (a decoding unit in a decoding process) may be variously set. For example, referring to FIG. 13, if the size of a luminance component coding unit is N×N, on which intra prediction is performed, the numbers of intra prediction modes actually performed on 2×2, 4×4, 8×8, 16×16, 32×32, 64×64, and 128×128-sized luminance component coding units may be respectively set as 5, 9, 9, 17, 33, 5, and 5 (in Example 2). For another example, when a size of a luminance component coding unit to be intra-predicted is N×N, numbers of intra prediction modes to be actually performed on coding units having sizes of 2×2, 4×4, 8×8, 16×16, 32×32, 64×64, and 128×128 may be set to be 3, 17, 34, 34, 34, 5, and 5. The numbers of intra prediction modes to be actually performed are differently set according to the sizes of luminance component coding units because overheads for encoding prediction mode information differ according to the sizes of the luminance component coding units. In other words, a small luminance component coding unit occupies a small portion of entire image data but may have a large overhead in order to transmit additional information, such as prediction mode information of the luminance component coding unit. Accordingly, if a luminance component small coding unit is encoded by using an excessively large number of prediction modes, the number of bits may be increased and thus compression efficiency may be reduced. Also, a luminance component large coding unit, e.g., a luminance component coding unit equal to or greater than 64×64, generally corresponds to a plain region of image data, and thus encoding of the large luminance component coding unit by using an excessively large number of prediction modes may also reduce compression efficiency.

Thus, according to an exemplary embodiment, luminance component coding units are roughly classified into at least three sizes such as N1×N1 (where 2≤N1≤4, and N1 is an integer), N2×N2 (where 8≤N2≤32, and N2 is an integer), and N3×N3 (where 64≤N3, and N3 is an integer). If the number of intra prediction modes performed on the luminance component coding units of N1×N1 is A1 (where A1 is a positive integer), the number of intra prediction modes performed on the luminance component coding units of N2×N2 is A2 (where A2 is a positive integer), and the number of intra prediction modes performed on the luminance component coding units of N3×N3 is A3 (where A3 is a positive integer). The numbers of intra prediction modes performed according to the sizes of the luminance component coding units may be set to satisfy A3≤A1≤A2. That is, if a current picture is split into small luminance component coding units, medium luminance component coding units, and large luminance component coding units, the medium luminance component coding units may be set to have the largest number of prediction modes and the small luminance component coding units and the large luminance component coding units may be set to have a relatively small number of prediction modes. However, the exemplary embodiment is not limited thereto, and the small and large luminance component coding units may also be set to have a large number of prediction modes. The numbers of prediction modes according to the sizes of luminance component coding units in FIG. 13 are merely exemplarily and may be changed.

Figures 14A, 14B:
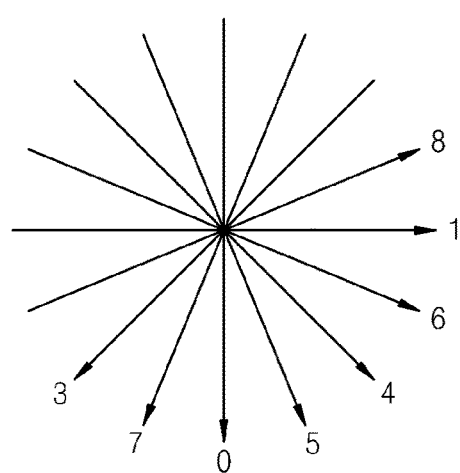
FIGS. 14A through 14C are diagrams for explaining intra prediction modes applied to a luminance component coding unit having a predetermined size, according to an exemplary embodiment.

FIG. 14A is a table showing intra prediction modes applied to a luminance component coding unit having a predetermined size, according to an exemplary embodiment.

Referring to FIGS. 13 and 14A, for example, when intra prediction is performed on a luminance component coding unit having a 4×4 size, the luminance component coding unit may have a vertical mode (mode 0), a horizontal mode (mode 1), a direct current (DC) mode (mode 2), a diagonal down-left mode (mode 3), a diagonal down-right mode (mode 4), a vertical-right mode (mode 5), a horizontal-down mode (mode 6), a vertical-left mode (mode 7), and a horizontal-up mode (mode 8).

FIG. 14B illustrates directions of the intra prediction modes shown in FIG. 14A. In FIG. 14B, numbers at ends of arrows represent prediction modes corresponding to prediction directions indicated by the arrows. Here, mode 2 is a DC mode having no directionality and thus is not shown in FIG. 16B.

Figure 14C:
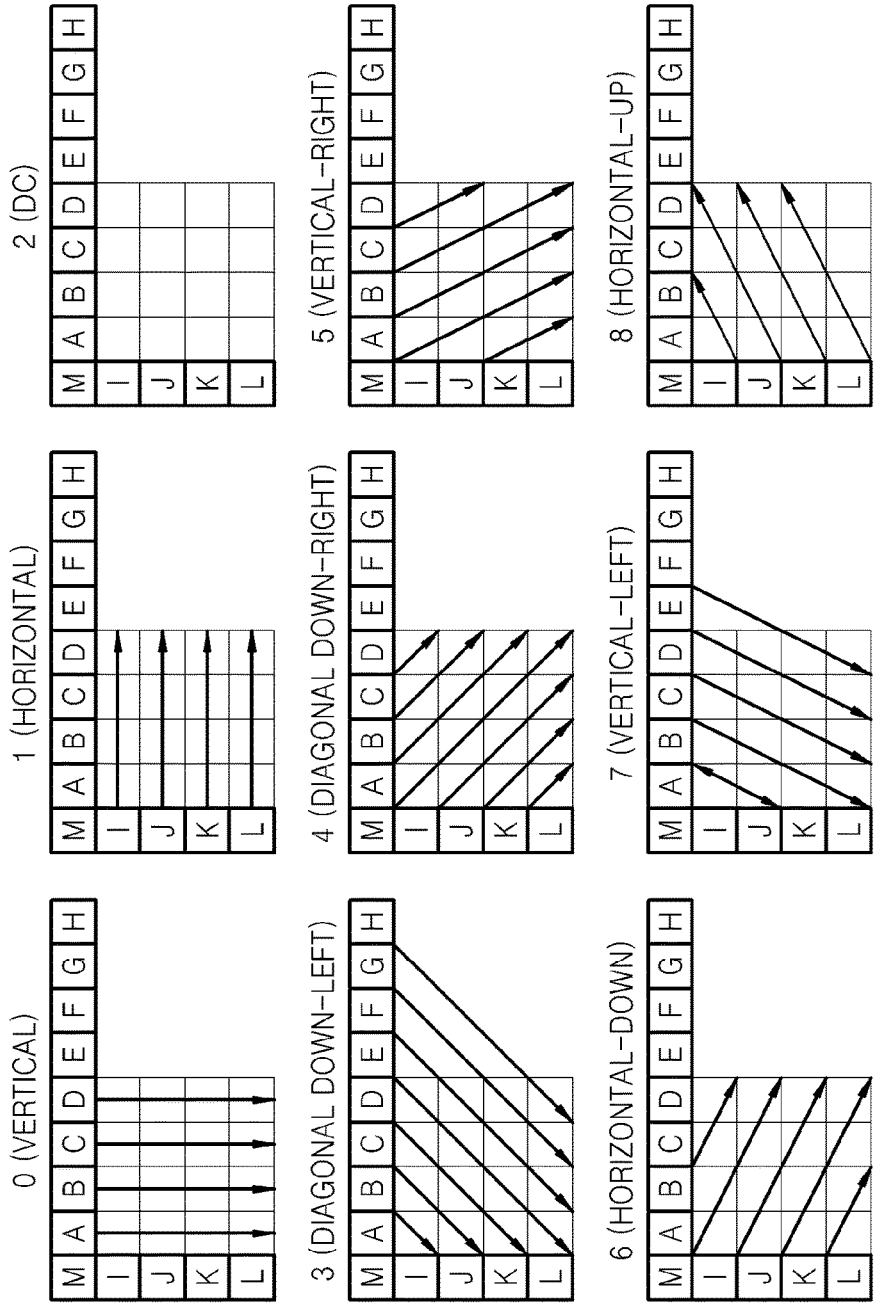

FIG. 14C is a diagram for describing a method of performing intra prediction on a luminance component coding unit by using the intra prediction modes shown in FIG. 14A, according to an exemplary embodiment.

Referring to FIG. 14C, a prediction coding unit is generated according to an available intra prediction mode determined according to the size of a current luminance component coding unit by using neighboring pixels A through M of the current luminance component coding unit. For example, an operation of performing prediction encoding on a current coding unit having a 4×4 size according to mode 0, i.e., a vertical mode, shown in FIG. 14A will be described. Initially, values of the neighboring pixels A through D at an upper side of the current coding unit are predicted as pixel values of the current coding unit. That is, the value of the neighboring pixel A is predicted as a value of four pixels in a first column of the current coding unit, the value of the neighboring pixel B is predicted as a value of four pixels in a second column of the current coding unit, the value of the neighboring pixel C is predicted as a value of four pixels in a third column of the current coding unit, and the value of the neighboring pixel D is predicted as a value of four pixels in a fourth column of the current coding unit. After that, the pixel values of the current coding unit predicted by using the neighboring pixels A through D are subtracted from the pixel values of the original current coding unit to calculate an error value and then the error value is encoded.

FIG. 15 is a diagram for explaining intra prediction modes applied to a luminance component coding unit having a predetermined size, according to an exemplary embodiment.

Referring to FIGS. 13 and 15, for example, when intra prediction is performed on a coding unit having a 2×2 size, the coding unit may have a total of five modes, such as a vertical mode, a horizontal mode, a DC mode, a plane mode, and a diagonal down-right mode.

Meanwhile, if a luminance component coding unit having a 32×32 size has 33 intra prediction modes, as shown in FIG. 13, directions of the 33 intra prediction modes need to be set. According to an exemplary embodiment, in order to set intra prediction modes having various directions in addition to the intra prediction modes illustrated in FIGS. 14 and 15, prediction directions for selecting neighboring pixels used as reference pixels of pixels of the luminance component coding unit are set by using (dx, dy) parameters. For example, if each of the 33 prediction modes is defined as mode N (where N is an integer from 0 to 32), mode 0 may be set as a vertical mode, mode 1 may be set as a horizontal mode, mode 2 may be set as a DC mode, mode 3 may be set as a plane mode, and each of mode 4 through mode 31 may be defined as a prediction mode having a directionality of $\tan^{-1}(dy/dx)$ by using (dx, dy) represented as one of (1,−1), (1,1), (1,2), (2,1), (1,−2), (2,1), (1,−2), (2,−1), (2,−11), (5,−7), (10,−7), (11,3), (4,3), (1,11), (1,−1), (12,−3), (1,−11), (1,−7), (3,−10), (5,−6), (7,−6), (7,−4), (11,1), (6,1), (8,3), (5,3), (5,7), (2,7), (5,−7), and (4,−3) as shown in Table 1.

TABLE 1

| mode # | dx | dy |
| --- | --- | --- |
| mode 4 | 1 | −1 |
| mode 5 | 1 | 1 |
| mode 6 | 1 | 2 |
| mode 7 | 2 | 1 |
| mode 8 | 1 | −2 |
| mode 9 | 2 | −1 |
| mode 10 | 2 | −11 |
| mode 11 | 5 | −7 |
| mode 12 | 10 | −7 |
| mode 13 | 11 | 3 |
| mode 14 | 4 | 3 |
| mode 15 | 1 | 11 |
| mode 16 | 1 | −1 |
| mode 17 | 12 | −3 |
| mode 18 | 1 | −11 |
| mode 19 | 1 | −7 |
| mode 20 | 3 | −10 |
| mode 21 | 5 | −6 |
| mode 22 | 7 | −6 |
| mode 23 | 7 | −4 |
| mode 24 | 11 | 1 |
| mode 25 | 6 | 1 |
| mode 26 | 8 | 3 |
| mode 27 | 5 | 3 |
| mode 28 | 5 | 7 |
| mode 29 | 2 | 7 |
| mode 30 | 5 | −7 |
| mode 31 | 4 | −3 |

Mode 0 is a vertical mode, mode 1 is a horizontal mode, mode 2 is a DC mode, mode 3 is a plane mode, and mode 32 is a bi-linear mode.

Mode 32 may be set as a bi-linear mode that uses bi-linear interpolation as will be described later with reference to FIG. 16.

Figure 16A:
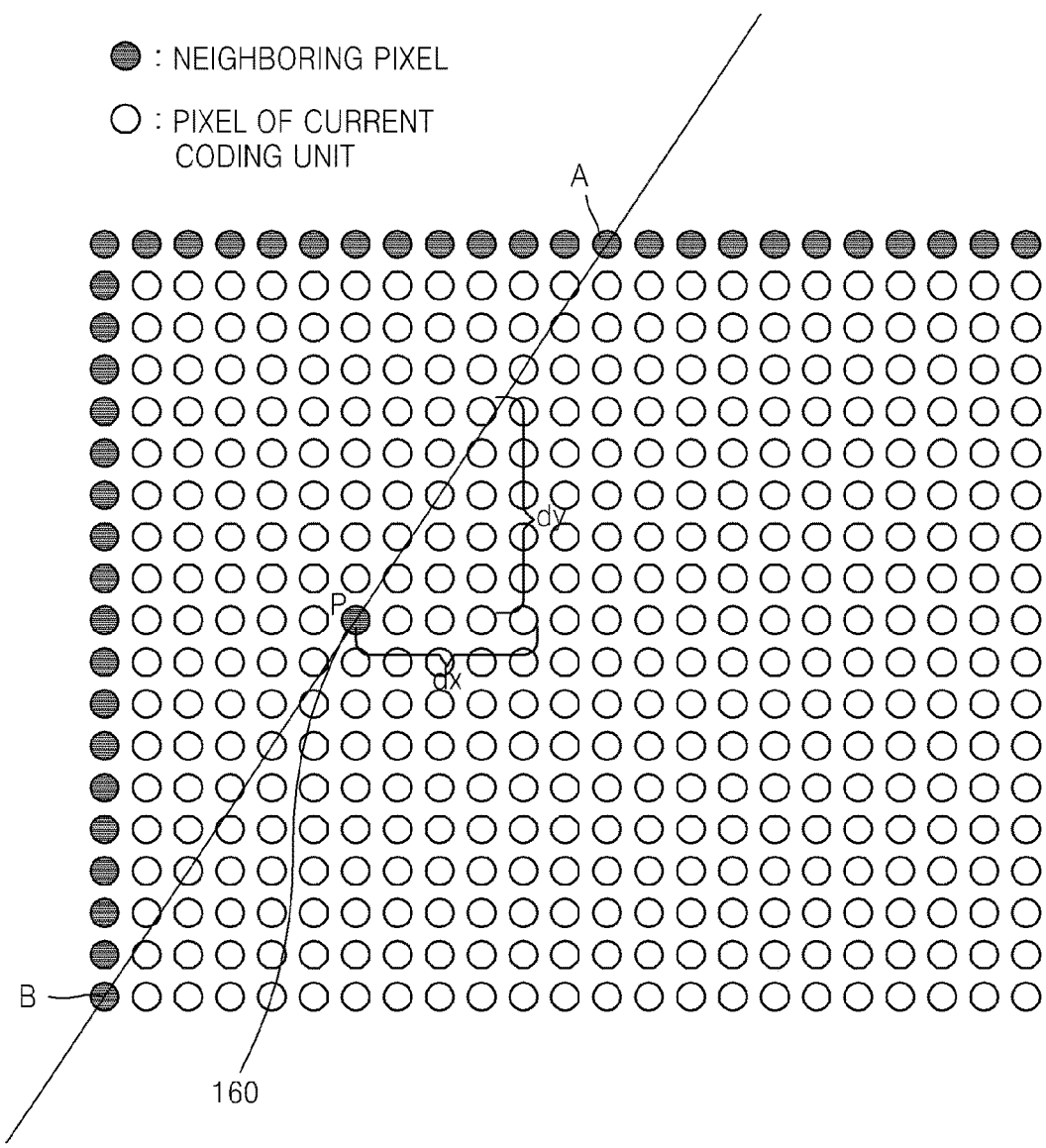
FIG. 16A through 16C are a reference diagram for explaining intra prediction modes of a luminance component coding unit having various directionalities, according to an exemplary embodiment.

FIG. 16A thorough 16C is a reference diagrams for explaining intra prediction modes of a luminance component coding unit having various directionalities, according to an exemplary embodiment.

As described above with reference to Table 1, each of the intra prediction modes according to exemplary embodiments may have directionality of $\tan^{-1}(dy/dx)$ by using a plurality of (dx, dy) parameters.

Referring to FIG. 16A, neighboring pixels A and B on a line 160 that extends from a current pixel P in a current luminance component coding unit, which is to be predicted, at an angle of $\tan^{-1}(dy/dx)$ determined by a value of a (dx, dy) parameter according to a mode, as shown in Table 1, may be used as predictors of the current pixel P. In this case, the neighboring pixels A and B may be pixels that have been encoded and restored, and belong to previous coding units located above and to the left side of the current coding unit. Also, when the line 160 does not pass along neighboring pixels on locations each having an integral value but passes between these neighboring pixels, neighboring pixels closer to the line 160 may be used as predictors of the current pixel P. Also, a weighted average value considering a distance between an intersection of the line 160 and neighboring pixels close to the line 160 may be used as a predictor for the current pixel P. If two pixels that meet the line 160, e.g., the neighboring pixel A located above the current pixel P and the neighboring pixel B located to the left side of the current pixel P, are present, an average of pixel values of the neighboring pixels A and B may be used as a predictor of the current pixel P. Otherwise, if a product of values of the 'dx' and 'dy' parameters is a positive value, the neighboring pixel A may be used, and if the product of the values of the 'dx' and 'dy' parameters is a negative value, the neighboring pixel B may be used.

Figure 16B:
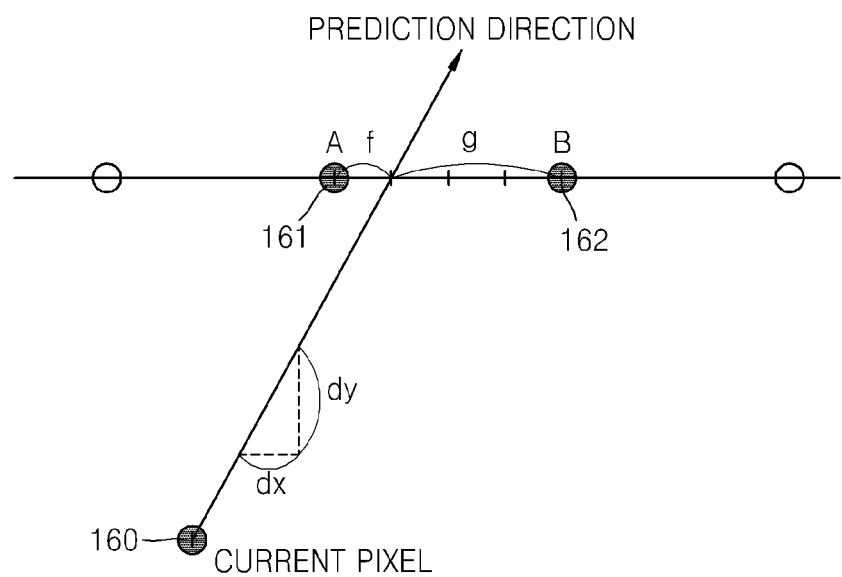
Figure 16C:
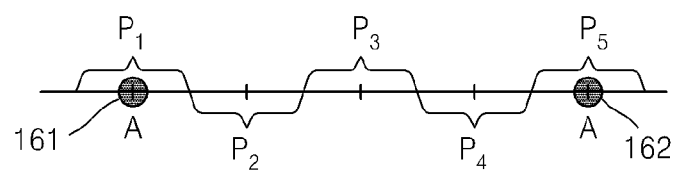

FIGS. 16B and 16C are reference diagrams for explaining a process of generating a predictor when the line 160 of FIG. 16A passes between, not through, neighboring pixels of integer locations.

Referring to FIG. 16B, if the line 160 having an angle of $\tan^{-1}(dy/dx)$ that is determined according to (dx, dy) of each mode passes between a neighboring pixel A 161 and a neighboring pixel B 162 of integer locations, a weighted average value considering a distance between an intersection of the extended line 160 and the neighboring pixels A 161 and B 162 close to the extended line 160 may be used as a predictor as described above. For example, if a distance between the neighboring pixel A 161 and the intersection of the extended line 160 having the angle of $\tan^{-1}(dy/dx)$ is f, and a distance between the neighboring pixel B 162 and the intersection of the extended line 160 is g, a predictor for the current pixel P may be obtained as (A*g+B*f)/(f+g). Here, f and g may be each a normalized distance using an integer. If software or hardware is used, the predictor for the current pixel P may be obtained by shift operation as (g*A+f*B+2)>>2. As shown in FIG. 16B, if the extended line 160 passes through a first quarter close to the neighboring pixel A 161 from among four parts obtained by quartering a distance between the neighboring pixel A 161 and the neighboring pixel B 162 of the integer locations, the predictor for the current pixel P may be acquired as (3*A+B)/4. Such operation may be performed by shift operation considering rounding-off to a nearest integer like (3*A+B+2)>>2.

Meanwhile, if the extended line 160 having the angle of $\tan^{-1}(dy/dx)$ that is determined according to (dx, dy) of each mode passes between the neighboring pixel A 161 and the neighboring pixel B 162 of the integer locations, a section between the neighboring pixel A 161 and the neighboring pixel B 162 may be divided into a predetermined number of areas, and a weighted average value considering a distance between an intersection and the neighboring pixel A 161 and the neighboring pixel B 162 in each divided area may be used as a prediction value. For example, referring to FIG. 16C, a section between the neighboring pixel A 161 and the neighboring pixel B 162 may be divided into five sections P1 through P5 as shown in FIG. 16C, a representative weighted average value considering a distance between an intersection and the neighboring pixel A 161 and the neighboring pixel B 162 in each section may be determined, and the representative weighted average value may be used as a predictor for the current pixel P. In detail, if the extended line 160 passes through the section P1, a value of the neighboring pixel A may be determined as a predictor for the current pixel P. If the extended line 160 passes through the section P2, a weighted average value (3*A+1*B+2)>>2 considering a distance between the neighboring pixels A and B and a middle point of the section P2 may be determined as a predictor for the current pixel P. If the extended line 160 passes through the section P3, a weighted average value (2*A+2*B+2)>>2 considering a distance between the neighboring pixels A and B and a middle point of the section P3 may be determined as a predictor for the current pixel P. If the extended line 160 passes through the section P4, a weighted average value (1*A+3*B+2)>>2 considering a distance between the neighboring pixels A and B and a middle point of the section P4 may be determined as a predictor for the current pixel P. If the extended line 160 passes through the section P5, a value of the neighboring pixel B may be determined as a predictor for the current pixel P.

Also, if two neighboring pixels, that is, the neighboring pixel A on the up side and the neighboring pixel B on the left side meet the extended line 160 as shown in FIG. 16A, an average value of the neighboring pixel A and the neighboring pixel B may be used as a predictor for the current pixel P, or if (dx*dy) is a positive value, the neighboring pixel A on the up side may be used, and if (dx*dy) is a negative value, the neighboring pixel B on the left side may be used.

The intra prediction modes having various directionalities shown in Table 1 may be predetermined by an encoding side and a decoding side, and only an index of an intra prediction mode of each coding unit may be transmitted.

Figure 17:
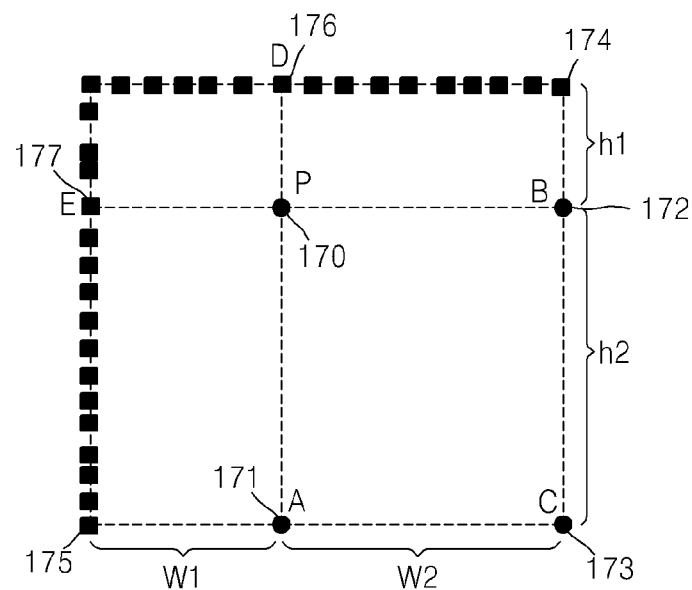
FIG. 17 is a reference diagram for explaining a bi-linear mode according to an exemplary embodiment.

FIG. 17 is a reference diagram for explaining a bi-linear mode according to an exemplary embodiment.

Referring to FIG. 17, in the bi-linear mode, a geometric average is calculated by considering a value of a current pixel P 170 in a current luminance component coding unit, which is to be predicted, values of pixels on upper, lower, left, and right boundaries of the current luminance component coding unit, and the distances between the current pixel P 170 and the upper, lower, left, and right boundaries of the current luminance component coding unit. The geometric average is then used as a predictor of the current pixel P 170. For example, in the bi-linear mode, a geometric average calculated using a virtual pixel A 171, a virtual pixel B 172, a pixel D 176, and a pixel E 177 located to the upper, lower, left, and right sides of the current pixel P 170, and the distances between the current pixel P 170 and the upper, lower, left, and right boundaries of the current luminance component coding unit, is used as a predictor of the current pixel P 170. Since the bi-linear mode is one of the intra prediction modes, neighboring pixels that have been encoded and restored, and belong to previous luminance component coding units, are used as reference pixels for prediction. Thus, pixel values in the current luminance component coding unit are not used, but virtual pixel values calculated using neighboring pixels located to the upper and left sides of the current luminance component coding unit are used as the pixel A 171 and the pixel B 172.

Specifically, first, a value of a virtual pixel C 173 on a lower rightmost point of the current luminance component coding unit is calculated by calculating an average of values of a neighboring pixel (right-up pixel) 174 on an upper rightmost point of the current luminance component coding unit and a neighboring pixel (left-down pixel) 175 on a lower leftmost point of the current luminance component coding unit, as expressed in Equation 1 below:

$$C=0.5(LeftDownPixel+RightUpPixel) \qquad \text{[Equation 1]}$$

Next, a value of the virtual pixel A 171 located on a lowermost boundary of the current luminance component coding unit when the current pixel P 170 is extended downward by considering the distance W1 between the current pixel P 170 and the left boundary of the current luminance component coding unit and the distance W2 between the current pixel P 170 and the right boundary of the current luminance component coding unit, is calculated by using Equation 2 below:

$$A=(C*W1+LeftDownPixel*W2)/(W1+W2); \qquad \text{[Equation 2]}$$

A=(C*W1+LeftDownPixel*W2+((W1+W2)/2))/(W1+W2)When a value of W1+W2 in Equation 2 is a power of 2, like 2^n, A=(C*W1+LeftDownPixel*W2+((W1+W2)/2))/(W1+W2) may be calculated by shift operation as A=(C*W1+LeftDownPixel*W2+2^(n−1))>>n without division.

Similarly, a value of the virtual pixel B 172 located on a rightmost boundary of the current luminance component coding unit when the current pixel P 170 is extended in the right direction by considering the distance h1 between the current pixel P 170 and the upper boundary of the current luminance component coding unit and the distance h2 between the current pixel P 170 and the lower boundary of the current luminance component coding unit, is calculated by using Equation 3 below:

$$B=(C*h1+RightUpPixel*h2)/(h1+h2) \qquad \text{[Equation 3]}$$

B=(C*h1+RightUpPixel*h2)/((h1+h2)/2))/(h1+h2)

When a value of h1+h2 in Equation 3 is a power of 2, like 2^m, B=(C*h1+RightUpPixel*h2+((h1+h2)/2))/(h1+h2) may be calculated by shift operation as B=(C*h1+RightUpPixel*h2+2^(m−1))>>m without division.

Once the values of the virtual pixel B 172 on the right border and the virtual pixel A 171 on the down border of the current pixel P 170 are determined by using Equations 1 through 3, a predictor for the current pixel P 170 may be determined by using an average value of A+B+D+E. In detail, a weighted average value considering a distance between the current pixel P 170 and the virtual pixel A 171, the virtual pixel B 172, the pixel D 176, and the pixel E 177 or an average value of A+B+D+E may be used as a predictor for the current pixel P 170. For example, if a weighted average value is used and the size of block is 16×16, a predictor for the current pixel P may be obtained as (h1*A+h2*D+W1*B+W2*E+16)>>5. Such bilinear prediction is applied to all pixels in the current coding unit, and a prediction coding unit of the current coding unit in a bilinear prediction mode is generated.

According to an exemplary embodiment, prediction encoding is performed according to various intra prediction modes determined according to the size of a luminance component coding unit, thereby allowing efficient video compression based on characteristics of an image.

Since a greater number of intra prediction modes than intra prediction modes used in a conventional codec are used according to a size of a coding unit according to an exemplary embodiment, compatibility with the conventional codec may become a problem. In a conventional art, 9 intra prediction modes at the most may be used as shown in FIGS. 14A and 14B. Accordingly, it is necessary to map intra prediction modes having various directions selected according to an exemplary embodiment to one of a smaller number of intra prediction modes. That is, when a number of available intra prediction modes of a current coding unit is N1 (N1 is an integer), in order to make the available intra prediction modes of the current coding unit compatible with a coding unit of a predetermined size including N2 (N2 is an integer different from N1) intra prediction modes, the intra prediction modes of the current coding unit may be mapped to an intra prediction mode having a most similar direction from among the N2 intra prediction modes. For example, a total of 33 intra prediction modes are available as shown in Table 1 in the current coding unit, and it is assumed that an intra prediction mode finally applied to the current coding unit is the mode 14, that is, (dx,dy)=(4,3), having a directivity of $\tan^{-1}(3/4) \approx 36.87$ (degrees). In this case, in order to match the intra prediction mode applied to the current block to one of 9 intra prediction modes as shown in FIGS. 14A and 14B, the mode 4 (down_right) mode having a most similar directivity to the directivity of 36.87 (degrees) may be selected. That is, the mode 14 of Table 1 may be mapped to the mode 4 shown in FIG. 14B. Likewise, if an intra prediction mode applied to the current coding unit is selected to be the mode 15, that is, (dx,dy)=(1,11), from among the 33 available intra prediction modes of Table 1, since a directivity of the intra prediction mode applied to the current coding unit is $\tan^{-1}(11) \approx 84.80$ (degrees), the mode 0 (vertical) of FIG. 14B having a most similar directivity to the directivity 84.80 (degrees) may be mapped to the mode 15.

Meanwhile, in order to decode a luminance component coding unit encoded via intra prediction, prediction mode information is required to determine which intra prediction mode is used to encode a current luminance component coding unit. Accordingly, intra prediction mode information of the current luminance component encoding unit is added to a bitstream when encoding an image. At this time, an overhead may increase, thereby decreasing compression efficiency if intra prediction mode information of each luminance component coding unit is added to the bitstream.

Therefore, according to an exemplary embodiment, instead of transmitting the intra prediction mode information of the current luminance component coding unit, which is determined as a result of encoding the current luminance component coding unit, only a difference value between an actual value of an intra prediction mode and a prediction value of an intra prediction mode, which is predicted from a neighboring luminance component coding unit, is transmitted.

Figure 18:
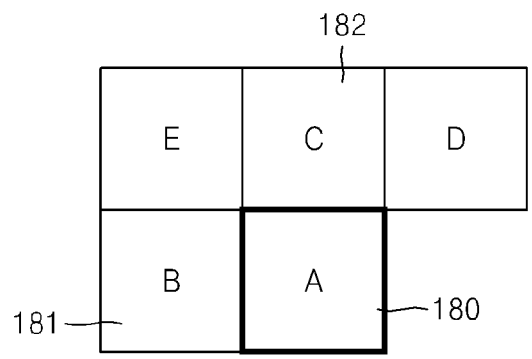
FIG. 18 is a diagram for explaining a process of generating a prediction value of an intra prediction mode of a current luminance component coding unit, according to an exemplary embodiment.

FIG. 18 is a diagram for explaining a process of generating a prediction value of an intra prediction mode of a current luminance component coding unit A 180, according to an exemplary embodiment.

Referring to FIG. 18, an intra prediction mode of the current luminance component coding unit A 180 may be predicted from intra prediction modes determined in neighboring luminance component coding units. For example, when an intra prediction mode of a left luminance component coding unit B 181 is mode 3, and an intra prediction mode of an upper luminance component coding unit C 182 is mode 4, the intra prediction mode of the current luminance component coding unit A 180 may be predicted to be mode 3, which has a smaller value from among the intra prediction modes of the upper luminance component coding unit C 182 and the left luminance component coding unit B 181. If an intra prediction mode determined as a result of actually performing intra prediction encoding on the current luminance component coding unit A 180 is mode 4, only 1, i.e., a difference value with mode 3 constituting the intra prediction mode predicted from the neighboring luminance component coding units, is transmitted as intra prediction mode information. A prediction value of an intra prediction mode of a current luminance component decoding unit is generated in the same manner during decoding, and a difference value received through a bitstream is added to the prediction value, thereby obtaining intra prediction mode information actually applied to the current luminance component decoding unit. In the above description, only the upper and left neighboring coding units C and B 182 and 181 of the current luminance component coding unit A 180 are used, but alternatively, the intra prediction mode of the current luminance component coding unit A may be predicted by using other neighboring luminance component coding units E and D of FIG. 18. An intra prediction mode of a luminance component coding unit may be used to predict an intra prediction mode of a chrominance component coding unit that will be described later.

Meanwhile, since an intra prediction mode actually performed differs according to sizes of luminance component coding units, an intra prediction mode predicted from neighboring luminance component coding units may not match an intra prediction mode of a current luminance component coding unit. Accordingly, in order to predict the intra prediction mode of the current luminance component coding unit from the neighboring luminance component coding units having different sizes, a mapping process for mapping different intra prediction modes of the luminance component coding units is required.

Figure 19A:
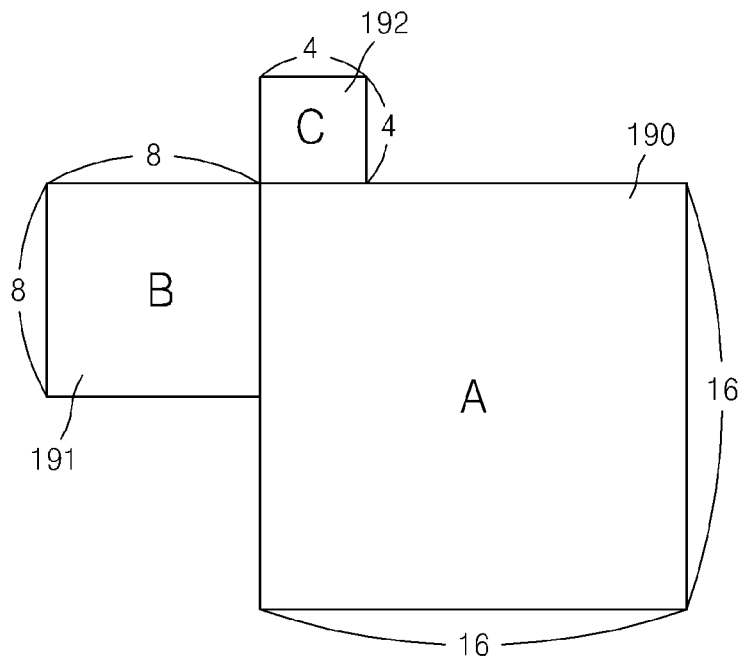
FIG. 19A through 19B are a reference diagram for explaining a mapping process of intra prediction modes between luminance component coding units having different sizes, according to an exemplary embodiment.
Figure 19B:
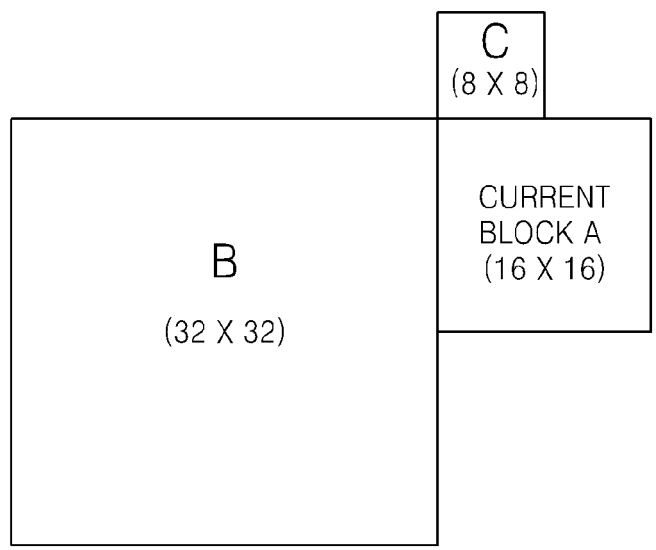

FIG. 19A and 19B are a reference diagrams for explaining a mapping process of intra prediction modes between luminance component coding units having different sizes, according to an exemplary embodiment.

Referring to FIG. 19A, a current luminance component coding unit A 190 has a size of 16×16, a left luminance component coding unit B 191 has a size of 8×8, and an upper luminance component coding unit C 192 has a size of 4×4. Also, as described with reference to FIG. 13, numbers of intra prediction modes usable in luminance component coding units respectively having sizes of 4×4, 8×8, and 16×16 are respectively 9, 9, and 33. Here, since the intra prediction modes usable in the left luminance component coding unit B 191 and the upper luminance component coding unit C 192 are different from the intra prediction modes usable in the current luminance component coding unit A 190, an intra prediction mode predicted from the left and upper luminance component coding units B and C 191 and 192 may not be suitable for use as a prediction value of the intra prediction mode of the current luminance component coding unit A 190. Accordingly in the current exemplary embodiment, the intra prediction modes of the left and upper luminance component coding units B and C 191 and 192 are respectively changed to first and second representative intra prediction modes in the most similar direction from among a predetermined number of representative intra prediction modes, and one of the first and second representative intra prediction modes, which has a smaller mode value, is selected as a final representative intra prediction mode. Then, an intra prediction mode having the most similar direction as the final representative intra prediction mode is selected from among the intra prediction modes usable in the current luminance component coding unit A 190 as an intra prediction mode of the current luminance component coding unit A 190.

Alternatively, referring to FIG. 19B, it is assumed that a current luminance component coding unit A has a size of 16×16, a left luminance component coding unit B has a size of 32×32, and an up luminance component coding unit C has a size of 8×8. Also, it is assumed that numbers of available intra prediction modes of the luminance component coding units having the sizes of 8×8, 16×16, and 32×32 are respectively 9, 9, and 33. Also, it is assumed that an intra prediction mode of the left luminance component coding unit B is a mode 4, and an intra prediction mode of the up luminance component coding unit C is a mode 31. In this case, since the intra prediction modes of the left luminance component coding unit B and the up luminance component coding unit C are not compatible with each other, each of the intra prediction modes of the left luminance component coding unit B and the up luminance component coding unit C is mapped to one of representative intra prediction modes shown in FIG. 20. Since the mode 31 that is the intra prediction mode of the left luminance component coding unit B has a directivity of (dx,dy)=(4, −3) as shown in Table 1, a mode 5 having a most similar directivity to $\tan^{-1}(-3/4)$ from among the representative intra prediction modes of FIG. 20 is mapped, and since the intra prediction mode mode 4 of the up luminance component coding unit C has the same directivity as that of the mode 4 from among the representative intra prediction modes of FIG. 20, the mode 4 is mapped.

The mode 4 having a smaller mode value from among the mode 5 that is the mapped intra prediction mode of the left luminance component coding unit B and the mode 4 that is the mapped intra prediction mode of the up luminance component coding unit C may be determined to be a prediction value of an intra prediction mode of the current luminance component coding unit, and only a mode difference value between an actual intra prediction mode and a predicted intra prediction mode of the current luminance component coding unit may be encoded as prediction mode information of the current luminance component coding unit.

Figure 20:
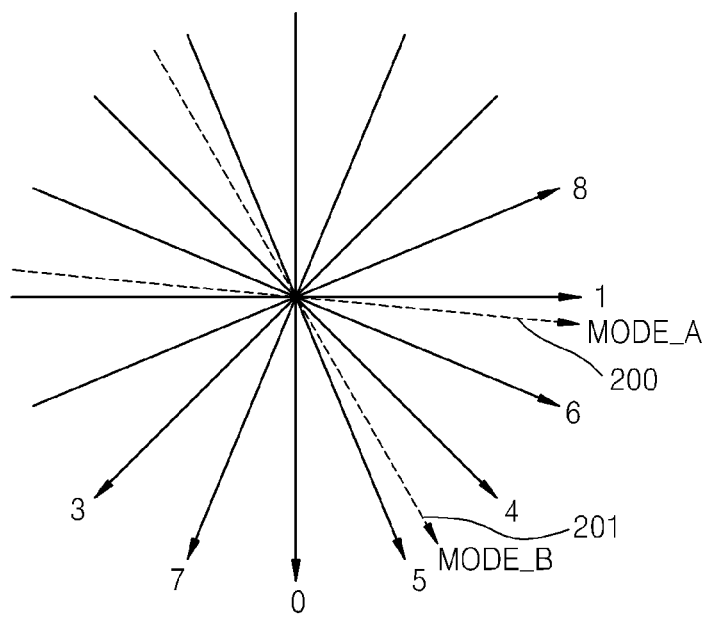
FIG. 20 is a reference diagram for explaining a process of mapping an intra prediction mode of a neighboring luminance component coding unit to one of representative intra prediction modes, according to an exemplary embodiment.

FIG. 20 is a reference diagram for explaining a process of mapping an intra prediction mode of a neighboring luminance component coding unit to one of representative intra prediction modes. In FIG. 20, a vertical mode 0, a horizontal mode 1, a DC mode 2, a diagonal-left mode 3, a diagonal-right mode 4, a vertical-right mode 5, a horizontal-down mode 6, a vertical-left mode 7, and a horizontal-up mode 8 are shown as representative intra prediction modes. However, the representative intra prediction modes are not limited thereto, and may be set to have various directionalities.

Referring to FIG. 20, a predetermined number of representative intra prediction modes are set, and an intra prediction mode of a neighboring luminance component coding unit is mapped as a representative intra prediction mode having the most similar direction. For example, when an intra prediction mode of an upper luminance component coding unit has a directionality indicated by MODE_A 200, the intra prediction mode MODE_A 200 of the upper luminance component coding unit is mapped to mode 1 having the most similar direction from among the predetermined representative intra prediction modes 1 through 9. Similarly, when an intra prediction mode of a left luminance component coding unit has a directionality indicated by MODE_B 201, the intra prediction mode MODE_B 201 of the left luminance component coding unit is mapped to mode 5 having the most similar direction from among the predetermined representative intra prediction modes 1 through 9.

Then, one of first and second representative intra prediction modes having a smaller mode value is selected as a representative intra prediction mode of a final neighboring luminance component coding unit. A representative intra prediction mode having a smaller mode value is elected since a smaller mode value is generally set for intra prediction modes that occur more frequently. In other words, when different intra prediction modes are predicted based on the neighboring luminance component coding units, an intra prediction mode having a smaller mode value is more likely to occur. Accordingly, when different intra prediction modes are competing with each other, an intra prediction mode having a smaller mode value may be selected as a predictor or an intra prediction mode of the current luminance component coding unit.

Even when a representative intra prediction mode is selected based on the neighboring luminance component coding units, the selected representative intra prediction mode may not be used as a predictor of an intra prediction mode of a current luminance component coding unit. If the current luminance component coding unit A 190 has 33 intra prediction modes, and a number of representative intra prediction modes is 9 as described with reference to FIG. 19, an intra prediction mode of the current luminance component coding unit A 190, which corresponds to the representative intra prediction mode, does not exist. In this case, like mapping an intra prediction mode of a neighboring luminance component coding unit to a representative intra prediction mode as described above, an intra prediction mode having the most similar direction as a representative intra prediction mode selected from among intra prediction modes according to a size of the current luminance component coding unit may be finally selected as a predictor of the intra prediction mode of the current luminance component coding unit. For example, when a representative intra prediction mode finally selected based on the neighboring luminance component coding units of FIG. 20 is mode 1, an intra prediction mode having the directionality most similar to the directionality of mode 1 is selected from among intra prediction modes usable according the size of the current luminance component coding unit as a predictor of the intra prediction mode of the current luminance component coding unit.

Meanwhile, as described with reference to FIGS. 16A through 16C, if a predictor for the current pixel P is generated by using neighboring pixels on or close to the extended line 160, the extended line 160 has actually a directivity of $\tan^{-1}(dy/dx)$. In order to calculate the directivity, since division (dy/dx) is necessary, calculation is made down to decimal places when hardware or software is used, thereby increasing the amount of calculation. Accordingly, a process of setting dx and dy is used in order to reduce the amount of calculation when a prediction direction for selecting neighboring pixels to be used as reference pixels about a pixel in a coding unit is set by using dx, and dy parameters in a similar manner to that described with reference to Table 1.

Figure 25:
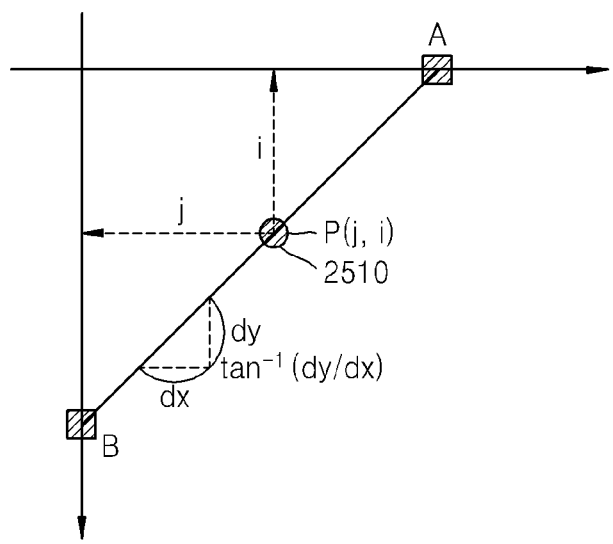
FIG. 25 is a diagram for explaining a relationship between a current pixel and neighboring pixels located on an extended line having a directivity of (dx, dy)

FIG. 25 is a diagram for explaining a relationship between a current pixel and neighboring pixels located on an extended line having a directivity of (dy/dx), according to an exemplary embodiment.

Referring to FIG. 25, it is assumed that a location of the current pixel P is P(j,i), and an up neighboring pixel and a left neighboring pixel B located on an extended line 2510 having a directivity, that is, a gradient, of $\tan^{-1}(dy/dx)$ and passing through the current pixel P are respectively A and B. When it is assumed that locations of up neighboring pixels correspond to an X-axis on a coordinate plane, and locations of left neighboring pixels correspond to a y-axis on the coordinate plate, the up neighboring pixel A is located at (j+i*dx/dy,0), and the left neighboring pixel B is located at (0,i+j*dy/dx). Accordingly, in order to determine any one of the up neighboring pixel A and the left neighboring pixel B for predicting the current pixel P, division, such as dx/dy or dy/dx, is required. Such division is very complex as described above, thereby reducing a calculation speed of software or hardware.

Accordingly, a value of any one of dx and dy representing a directivity of a prediction mode for determining neighboring pixels may be determined to be a power of 2. That is, when n and m are integers, dx and dy may be $2^n$ and $2^m$, respectively.

Referring to FIG. 25, if the left neighboring pixel B is used as a predictor for the current pixel P and dx has a value of $2^n$, j*dy/dx necessary to determine (0,i+j*dy/dx) that is a location of the left neighboring pixel B becomes (j*dy/($2^n$)), and division using such a power of 2 is easily obtained through shift operation as (j*dy)>>n, thereby reducing the amount of calculation.

Likewise, if the up neighboring pixel A is used as a predictor for the current pixel P and dy has a value of $2^m$, i*dx/dy necessary to determine (j+i*dx/dy,0) that is a location of the up neighboring pixel A becomes (i*dx)/($2^m$), and division using such a power of 2 is easily obtained through shift operation as (i*dx)>>m.

Figure 26:
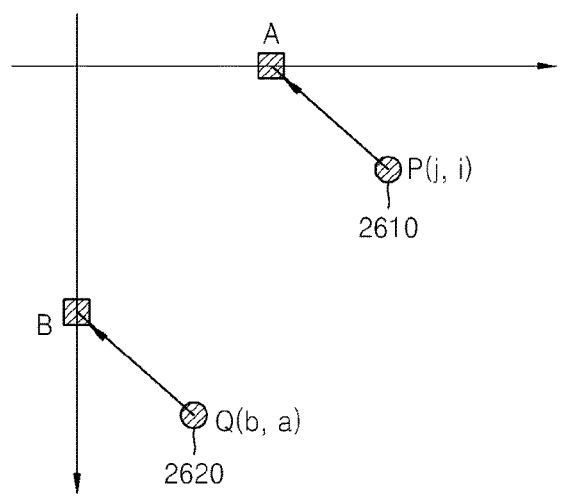
FIG. 26 is a diagram for explaining a change in a neighboring pixel located on an extended line having a directivity of (dx, dy) according to a location of a current pixel, according to an exemplary embodiment.

FIG. 26 is a diagram for explaining a change in a neighboring pixel located on an extended line having a directivity of (dx,dy) according to a location of a current pixel, according to an exemplary embodiment.

As a neighboring pixel necessary for prediction according to a location of a current pixel, any one of an up neighboring pixel and a left neighboring pixel is selected.

Referring to FIG. 26, when a current pixel 2610 is P(j,i) and is predicted by using a neighboring pixel located in a prediction direction, an up pixel A is used to predict the current pixel P 2610. When the current pixel 2610 is Q(b,a), a left pixel B is used to predict the current pixel Q 2620.

If only a dy component of a y-axis direction from among (dx, dy) representing a prediction direction has a power of 2 like $2^m$, while the up pixel A in FIG. 26 may be determined through shift operation without division such as (j+(i*dx)>>m, 0), the left pixel B requires division such as (0, a+b*$2^m$/dx). Accordingly, in order to exclude division when a predictor is generated for all pixels of a current block, all of dx and dy may have a type of power of 2.

Figure 27:
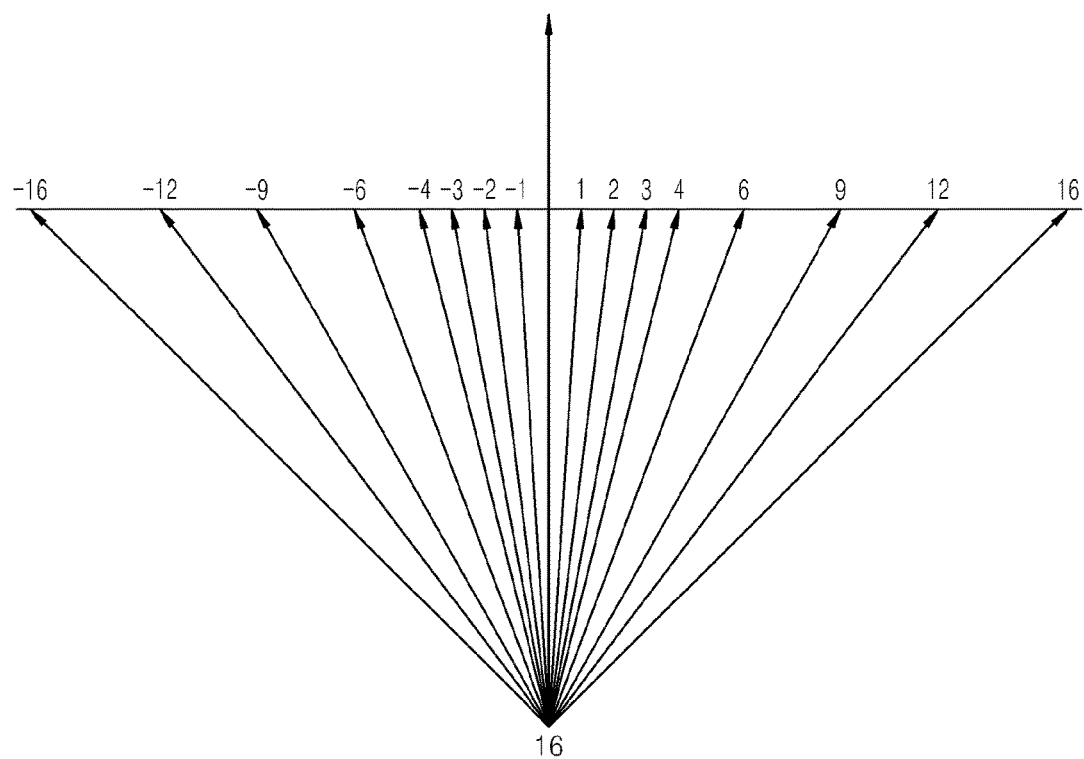
FIGS. 27 and 28 are diagrams for explaining a method of determining an intra prediction mode direction, according to exemplary embodiments.
Figure 28:
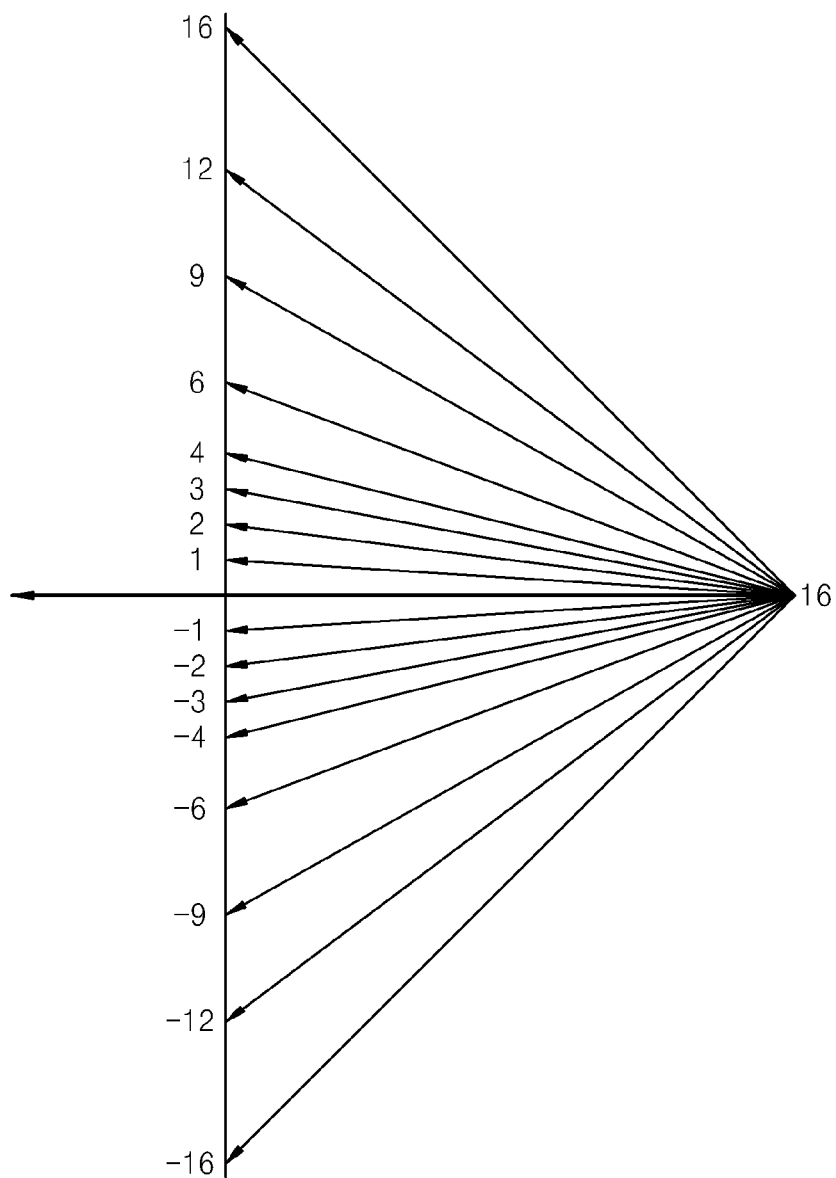

FIGS. 27 and 28 are diagrams for explaining a method of determining an intra prediction mode direction, according to exemplary embodiments.

In general, there are many cases where linear patterns shown in an image or a video signal are vertical or horizontal. Accordingly, when intra prediction modes having various directivities are defined by using parameters dx and dy, image coding efficiency may be improved by defining values dx and dy as follows.

In detail, if dy has a fixed value of $2^m$, an absolute value of dx may be set so that a distance between prediction directions close to a vertical direction is narrow, and a distance between prediction modes closer to a horizontal direction is wider. For example, referring to FIG. 27, if dy has a value of $2^4$, that is, 16, a value of dx may be set to be 1,2,3,4,6,9,12, 16,0,−1,−2,−3,−4,−6, −9,−12, and −16 so that a distance between prediction directions close to a vertical direction is narrow and a distance between prediction modes closer to a horizontal direction is wider.

Likewise, if dx has a fixed value of $2^n$, an absolute value of dy may be set so that a distance between prediction directions close to a horizontal direction is narrow and a distance between prediction modes closer to a vertical direction is wider. For example, referring to FIG. 28, if dx has a value of $2^4$, that is, 16, a value of dy may be set to be 1,2,3,4,6,9,12, 16,0,−1,−2,−3,−4,−6,−9,−12, and −16 so that a distance between prediction directions close to a horizontal direction is narrow and a distance between prediction modes closer to a vertical direction is wider.

Also, when one of values of dx and dy is fixed, the remaining value may be set to be increased according to a prediction mode. For example, if dy is fixed, a distance between dx may be set to be increased by a predetermined value. Also, an angle of a horizontal direction and a vertical direction may be divided in predetermined units, and such an increased amount may be set in each of the divided angles. For example, if dy is fixed, a value of dx may be set to have an increased amount of a in a section less than 15 degrees, an increased amount of b in a section between 15 degrees and 30 degrees, and an increased width of c in a section greater than 30 degrees. In this case, in order to have such a shape as shown in FIG. 25, the value of dx may be set to satisfy a relationship of a<b<c.

For example, prediction modes described with reference to FIGS. 25 through 28 may be defined as a prediction mode having a directivity of $\tan^{-1}(dy/dx)$ by using (dx, dy) as shown in Tables 2 through 4.

TABLE 2

| dx | Dy | dx | dy | dx | dy |
|---|---|---|---|---|---|
| −32 | 32 | 21 | 32 | 32 | 13 |
| −26 | 32 | 26 | 32 | 32 | 17 |
| −21 | 32 | 32 | 32 | 32 | 21 |
| −17 | 32 | 32 | −26 | 32 | 26 |
| −13 | 32 | 32 | −21 | 32 | 32 |
| −9 | 32 | 32 | −17 | | |
| −5 | 32 | 32 | −13 | | |
| −2 | 32 | 32 | −9 | | |
| 0 | 32 | 32 | −5 | | |
| 2 | 32 | 32 | −2 | | |
| 5 | 32 | 32 | 0 | | |
| 9 | 32 | 32 | 2 | | |
| 13 | 32 | 32 | 5 | | |
| 17 | 32 | 32 | 9 | | |

TABLE 3

| dx | Dy | dx | dy | dx | Dy |
|---|---|---|---|---|---|
| −32 | 32 | 19 | 32 | 32 | 10 |
| −25 | 32 | 25 | 32 | 32 | 14 |
| 9 | 32 | 32 | 32 | 32 | 19 |
| −14 | 32 | 32 | −25 | 32 | 25 |

TABLE 3-continued

| dx | Dy | dx | dy | dx | Dy |
|---|---|---|---|---|---|
| −10 | 32 | 32 | −19 | 32 | 32 |
| −6 | 32 | 32 | −14 | | |
| −3 | 32 | 32 | −10 | | |
| −1 | 32 | 32 | −6 | | |
| 0 | 32 | 32 | −3 | | |
| 1 | 32 | 32 | −1 | | |
| 3 | 32 | 32 | 0 | | |
| 6 | 32 | 32 | 1 | | |
| 10 | 32 | 32 | 3 | | |
| 14 | 32 | 32 | 6 | | |

TABLE 4

| dx | Dy | dx | dy | dx | dy |
|---|---|---|---|---|---|
| −32 | 32 | 23 | 32 | 32 | 15 |
| −27 | 32 | 27 | 32 | 32 | 19 |
| −23 | 32 | 32 | 32 | 32 | 23 |
| −19 | 32 | 32 | −27 | 32 | 27 |
| −15 | 32 | 32 | −23 | 32 | 32 |
| −11 | 32 | 32 | −19 | | |
| −7 | 32 | 32 | −15 | | |
| −3 | 32 | 32 | −11 | | |
| 0 | 32 | 32 | −7 | | |
| 3 | 32 | 32 | −3 | | |
| 7 | 32 | 32 | 0 | | |
| 11 | 32 | 32 | 3 | | |
| 15 | 32 | 32 | 7 | | |
| 19 | 32 | 32 | 11 | | |

For example, referring to Table 2, a prediction mode having a directionality of $\tan^{-1}(dy/dx)$ by using (dx, dy) represented as one of (−32, 32), (−26, 32), (−21, 32), (−17, 32), (−13, 32), (−9, 32), (−5, 32), (−2, 32), (0.32), (2, 32), (5, 32), (9, 32), (13, 32), (17,32), (21, 32), (26, 32), (32, 32), (32, −26), (32, −21), (32, −17), (32, −13), (32, −9), (32, −5), (32, −2), (32, 0), (32, 2), (32, 5), (32, 9), (32, 13), (32, 17), (32, 21), (32, 26) and (32, 32).

Figure 21:
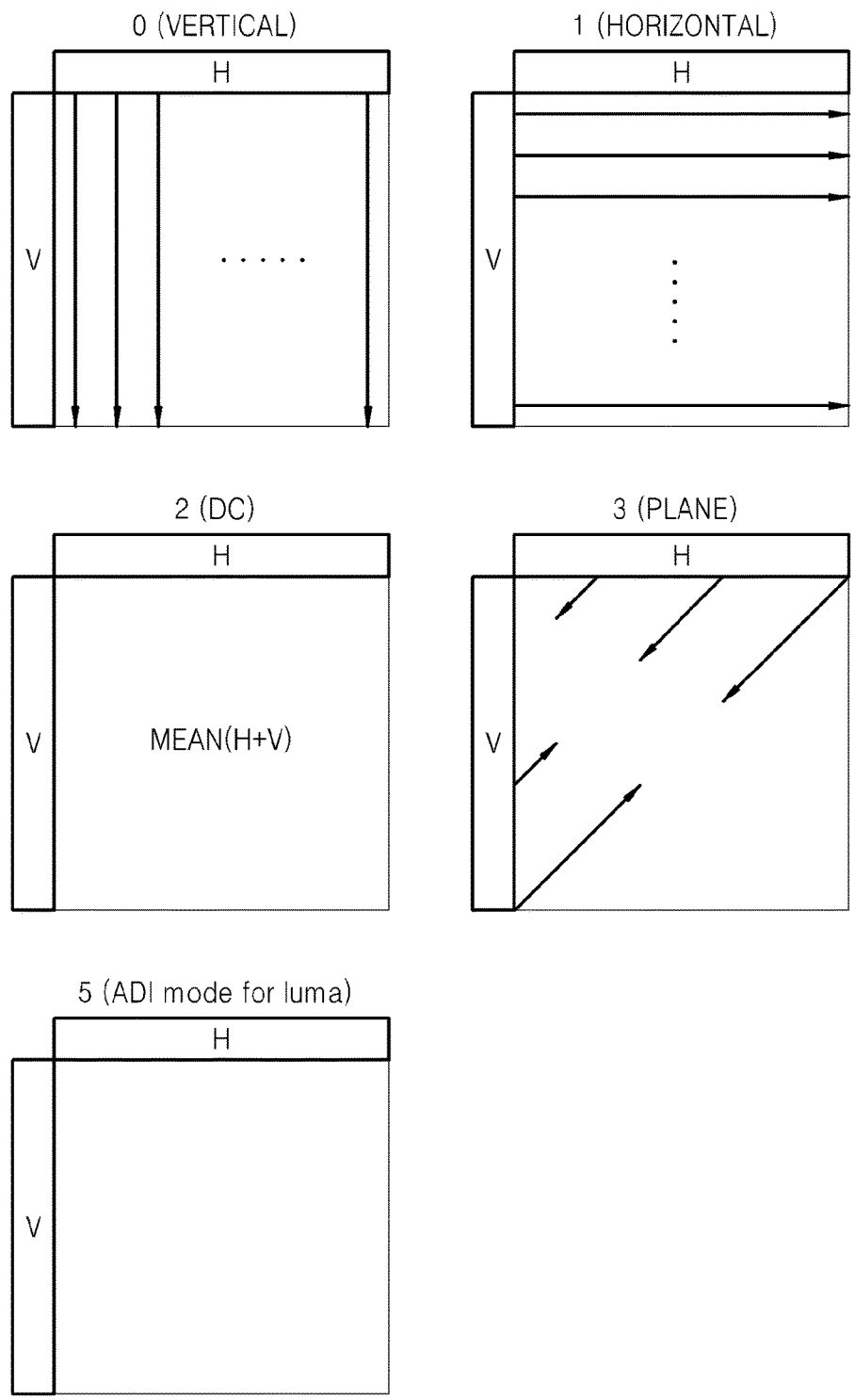
FIG. 21 is a diagram for explaining candidate intra prediction modes applied to a chrominance component coding unit, according to an exemplary embodiment.

FIG. 21 is a diagram for explaining candidate intra prediction modes applied to a chrominance component coding unit, according to an exemplary embodiment.

Referring to FIG. 21, candidate intra prediction modes applied while intra predicting a chrominance component coding unit include a vertical mode, a horizontal mode, a DC mode, a plane mode, and an intra prediction mode finally determined for a luminance component coding unit corresponding to a current chrominance component coding unit as described above. Also, as described above, a luminance component coding unit and a chrominance component coding unit, which are intra predicted, may be one of image signals having color formats of 4:2:0, 4:2:2, and 4:4:4 defined in a YCbCr (or YUV) color domain. An intra prediction mode having a minimum cost from among a plurality of usable intra prediction modes is selected as an intra prediction mode of the luminance component coding unit, based on cost calculation, such as a R-D cost. Costs of the candidate intra prediction modes are each calculated, and a candidate intra prediction mode having a minimum cost is selected as a final intra prediction mode of the chrominance component coding unit.

Figure 22:
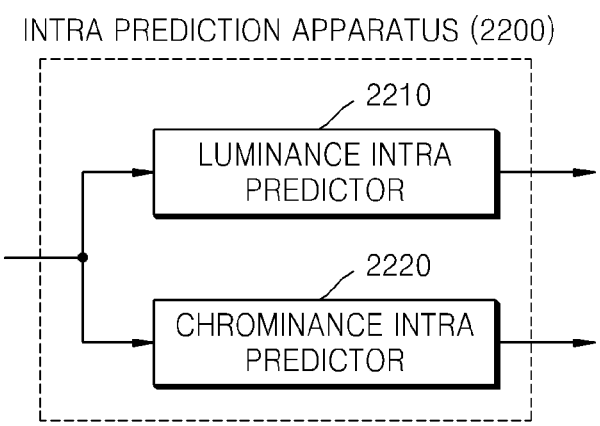
FIG. 22 is a block diagram of an intra prediction apparatus, according to an exemplary embodiment.

FIG. 22 is a block diagram of an intra prediction apparatus 2200 of an image, according to an exemplary embodiment. The intra prediction apparatus 2200 according to the current embodiment of the present invention may operate as an intra predictor 410 of the image encoder 400 of FIG. 4, and the intra predictor 550 of the image decoder 500 of FIG. 5.

Referring to FIG. 22, the intra prediction apparatus 2200 includes a luminance intra predictor 2210 and a chrominance intra predictor 2220. As described above, the luminance intra predictor 2210 selects candidate intra prediction modes to be applied according to a size of a current luminance component coding unit, based on a size of each luminance component coding unit split according to a maximum coding unit and a maximum depth, and applies the determined candidate intra prediction modes to the current luminance component coding unit to perform intra prediction on the current luminance component coding unit. The luminance intra predictor 2210 determines an optimum intra prediction mode having a minimum cost as a final intra prediction mode of the current luminance component coding unit based on costs according to an error value between a prediction coding unit generated via intra prediction, and an original luminance component coding unit.

The chrominance intra predictor 2220 calculates costs according to a vertical mode, a horizontal mode, a DC mode, a plane mode, and the final intra prediction mode of the luminance component coding unit corresponding to a current chrominance component coding unit, and determines an intra prediction mode having a minimum cost as a final intra prediction mode of the current chrominance component coding unit.

Meanwhile, when the intra prediction apparatus 2200 of FIG. 22 is applied to a decoding apparatus, sizes of current luminance and chrominance component decoding units are determined by using a maximum coding unit and depth information constituting hierarchical split information of the maximum coding unit, which are extracted from a bitstream by using the entropy decoder 520 of FIG. 5, and an intra prediction mode to be performed is determined by using information about an intra prediction mode information applied to the current luminance and chrominance component decoding units. Also, the intra prediction apparatus 2200 generates a prediction decoding unit by performing intra prediction on each luminance and chrominance component decoding units according to the extracted intra prediction mode. The prediction decoding unit is added to residual data restored from a bitstream, and thus the current luminance and chrominance component decoding units are decoded.

Figure 23:
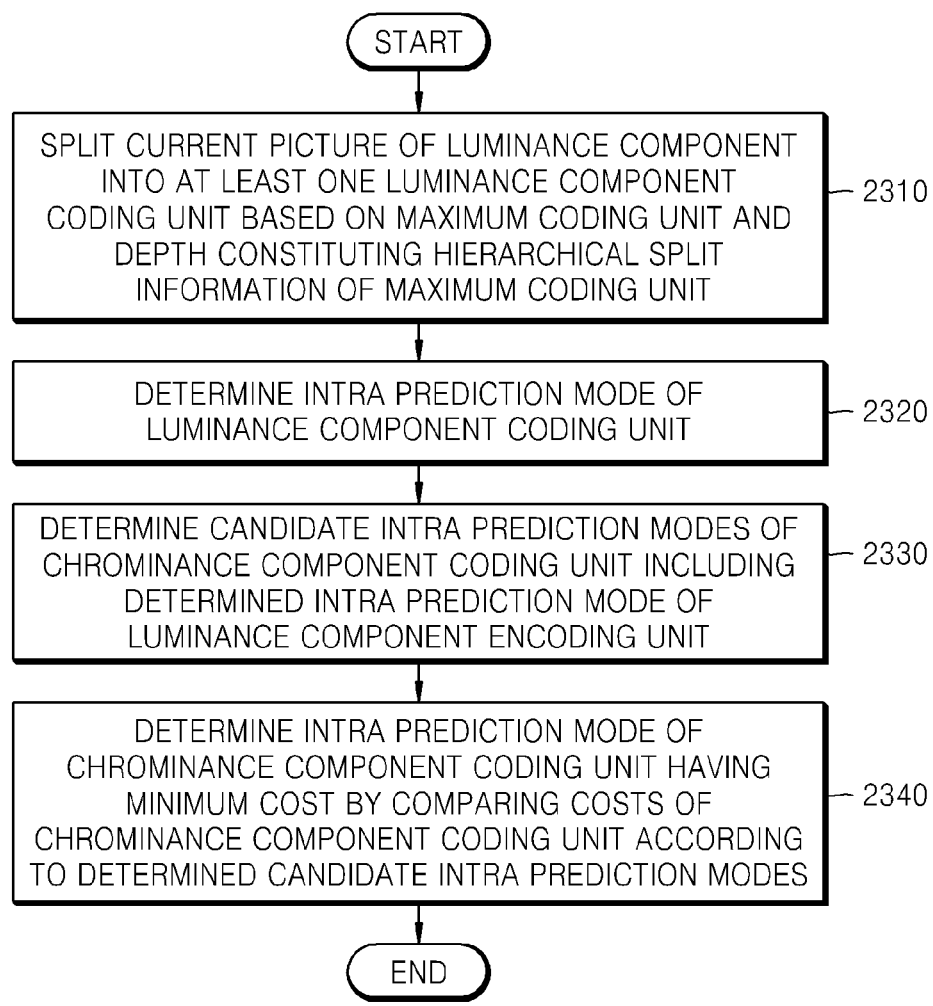
FIG. 23 is a flowchart illustrating a method of determining an intra prediction mode of a coding unit, according to an exemplary embodiment.

FIG. 23 is a flowchart illustrating a method of determining an intra prediction mode of a coding unit, according to an exemplary embodiment.

Referring to FIG. 23, a current picture of a luminance component is split into at least one luminance component coding unit based on a maximum coding unit and a depth constituting hierarchical split information of the maximum coding unit, in operation 2310.

In operation 2320, an intra prediction mode of the luminance component coding unit is determined. As described above, the intra prediction mode of the luminance component coding unit is determined by selecting candidate intra prediction modes to be applied based on a size of the luminance component coding unit, performing intra prediction on the luminance component coding unit by applying the candidate intra prediction modes on the luminance component coding unit, and then determining an optimum intra prediction mode having a minimum cost as the intra prediction mode of the luminance component coding unit.

In operation 2330, candidate intra prediction modes of a chrominance component coding unit, which include the determined intra prediction mode of the luminance component coding unit, are determined. As described above, the candidate intra prediction modes applied to the chrominance component coding unit include, aside from the determined intra prediction mode of the luminance component coding unit, a vertical mode, a horizontal mode, a DC mode, and a plane mode.

In operation 2340, costs of the chrominance component coding unit according to the determined candidate intra prediction modes are compared to determine an intra prediction mode having a minimum cost.

Figure 24:
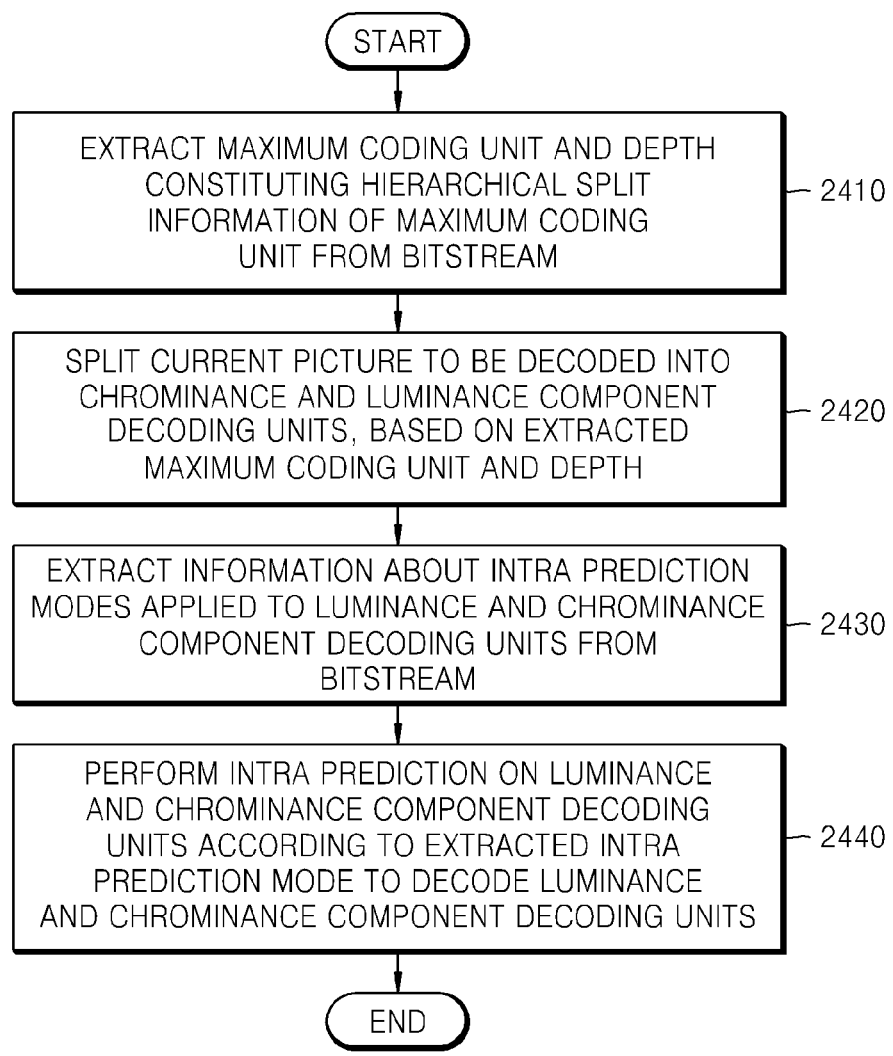
FIG. 24 is a flowchart illustrating a method of determining an intra prediction mode of a decoding unit, according to an exemplary embodiment.

FIG. 24 is a flowchart illustrating a method of determining an intra prediction mode of a decoding unit, according to an exemplary embodiment.

Referring to FIG. 24, a maximum coding unit and a depth constituting hierarchical spilt information of the maximum coding unit are extracted from a bitstream, in operation 2410.

In operation 2420, a current picture to be decoded is split into a luminance component decoding unit and a chrominance component decoding unit, based on the extracted maximum coding unit and depth.

In operation 2430, information about intra prediction modes applied to the luminance and chrominance component decoding units is extracted from the bitstream.

In operation 2440, intra prediction is performed on the luminance and chrominance component decoding units according to the extracted intra prediction modes, thereby decoding the luminance and chrominance component decoding units.

According to the exemplary embodiments, by adding the intra prediction mode of the luminance component coding unit having various directionality as the intra prediction mode of the chrominance component coding unit, the prediction efficiency of an image of a chrominance component, and the prediction efficiency of an entire image can be increased without having to increase a throughput.

The exemplary embodiments may be embodied as computer programs and can be implemented in general-use digital computers that execute the programs by using a computer readable recording medium. Examples of the computer readable recording medium include magnetic storage media (e.g., ROM, floppy disks, hard disks, etc.), optical recording media (e.g., CD-ROMs, or DVDs), and storage media.

The apparatuses of the exemplary embodiments may include a bus coupled to every unit of the apparatus or coder, at least one processor that is connected to the bus, the processor for executing commands, and a memory connected to the bus to store the commands, received messages, and generated messages.

While this invention has been particularly shown and described with reference to the exemplary embodiments, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for decoding an image, the apparatus comprising:
  a processor; and
  a memory storing a program which causes the processor to:

obtain first information that indicates an intra prediction mode of a luminance block and second information that indicates an intra prediction mode of a chrominance block corresponding to the luminance block, from bitstream, perform intra prediction on the luminance block according to the intra prediction mode of the luminance block and perform intra prediction on the chrominance block according to the intra prediction mode of the chrominance block, obtain a residual data from the bitstream, and restore the luminance block and the chrominance block using an intra-predicted luminance block, an intra-predicted chrominance block and the residual data, wherein the intra prediction mode of the luminance block includes a particular direction among a plurality of directions and the particular direction is indicated by one of dx number in a horizontal direction and a fixed number in a vertical direction, and dy number in the vertical direction and a fixed number in the horizontal direction, and wherein the dx number and the dy number are determined among {26, 21, 17, 13, 9, 5, 2, −2, −5, −9, −13, −17, −21, −26} according to the intra prediction mode of the luminance block, wherein the fixed number is 2^5, wherein the processor determines one of (i) a left neighboring pixel adjacent to a left side of the luminance block and (ii) an up neighboring pixel adjacent to an upper side of the luminance block, the left neighboring pixel is determined based on j*dy>>5, where >> indicates right shift operation, and the up neighboring pixel is determined based on i*dx>>5, and a location of a current pixel of the luminance block is (j,i), where j and i are integers, when the number of the neighboring pixels is 1, the processor obtains a prediction value of the current pixel based on the neighboring pixel; and when the number of the neighboring pixels is 2, the processor obtains the prediction value of the current pixel based on a weighted average of the neighboring pixels, wherein, when the second information indicates that the intra prediction mode of the chrominance block is equal to the intra prediction mode of the luminance block, the intra prediction mode of the chrominance block is determined to be equal to the intra prediction mode of the luminance block, wherein the image is split into a plurality of maximum coding units according to information about maximum size of a coding unit, a maximum coding unit, of the plurality of maximum coding units, is hierarchically split into one or more coding units of depths including at least one of a current depth and a lower depth according to split information, when the split information indicates a split for the current depth, a coding unit of the current depth is split into four coding units of the lower depth, independently from neighboring coding units, and when the split information indicates a non-split for the current depth, one or more prediction units are obtained from the coding unit of the current depth.

* * * * *